(12) United States Patent
Yoshikawa et al.

(10) Patent No.: US 11,990,901 B2
(45) Date of Patent: May 21, 2024

(54) SEMICONDUCTOR CIRCUIT AND SUPPORT DEVICE FOR LOGIC CIRCUIT DESIGN

(71) Applicant: TOHOKU UNIVERSITY, Sendai (JP)

(72) Inventors: Ko Yoshikawa, Sendai (JP); Yitao Ma, Sendai (JP); Tetsuo Endoh, Sendai (JP); Osamu Nomura, Sendai (JP); Li Tao, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 17/940,600

(22) Filed: Sep. 8, 2022

(65) Prior Publication Data

US 2023/0084986 A1 Mar. 16, 2023

(30) Foreign Application Priority Data

Sep. 10, 2021 (JP) ................................. 2021-148212

(51) Int. Cl.
| | |
|---|---|
| *H03K 3/01* | (2006.01) |
| *G06F 1/04* | (2006.01) |
| *G06F 1/08* | (2006.01) |
| *G06F 30/396* | (2020.01) |
| *H03K 3/037* | (2006.01) |
| *H03K 19/00* | (2006.01) |
| *H03K 19/20* | (2006.01) |

(52) U.S. Cl.
CPC .......... *H03K 19/0016* (2013.01); *G06F 1/04* (2013.01); *G06F 1/08* (2013.01); *G06F 30/396* (2020.01); *H03K 3/037* (2013.01); *H03K 19/20* (2013.01)

(58) Field of Classification Search
CPC ............ H03K 3/01; H03K 3/012; H03K 3/02; H03K 3/027; H03K 3/037; H03K 19/0008; H03K 19/0016; H03K 19/20; G06F 1/04; G06F 1/06; G06F 1/08; G06F 1/10; G06F 30/396

See application file for complete search history.

(56) References Cited

U.S. PATENT DOCUMENTS

| | | | |
|---|---|---|---|
| 10,545,556 B2* | 1/2020 | Venkatasubramanian | ................... G06F 1/3206 |
| 2013/0332758 A1* | 12/2013 | Sasaki | ........................ G06F 1/24 713/322 |

FOREIGN PATENT DOCUMENTS

| | | |
|---|---|---|
| JP | 2015-099451 A | 5/2015 |
| WO | 2013/099536 A1 | 7/2013 |

* cited by examiner

*Primary Examiner* — Long Nguyen
(74) *Attorney, Agent, or Firm* — Rabin & Berdo, P.C.

(57) ABSTRACT

A semiconductor circuit device includes a first clock gating circuit that outputs a first gated clock signal generated from a clock signal and a first enable signal, a non-volatile first flip-flop that operates in response to a clock pulse of the first gated clock signal, an acquisition circuit that acquires data inputted from the first flip-flop according to a second enable signal that enables or disables the acquisition of the data from the first flip-flop, and a power gating circuit that supplies electric power to the first flip-flop and receives the first and second enable signals as power source control signals. The power gating circuit includes a power switch, and supplies the electric power to the first flip-flop by turning ON the power switch when the power source control signals have logical values that enable the clock signal or the acquisition of the data in the acquisition circuit.

11 Claims, 26 Drawing Sheets

FIG. 27
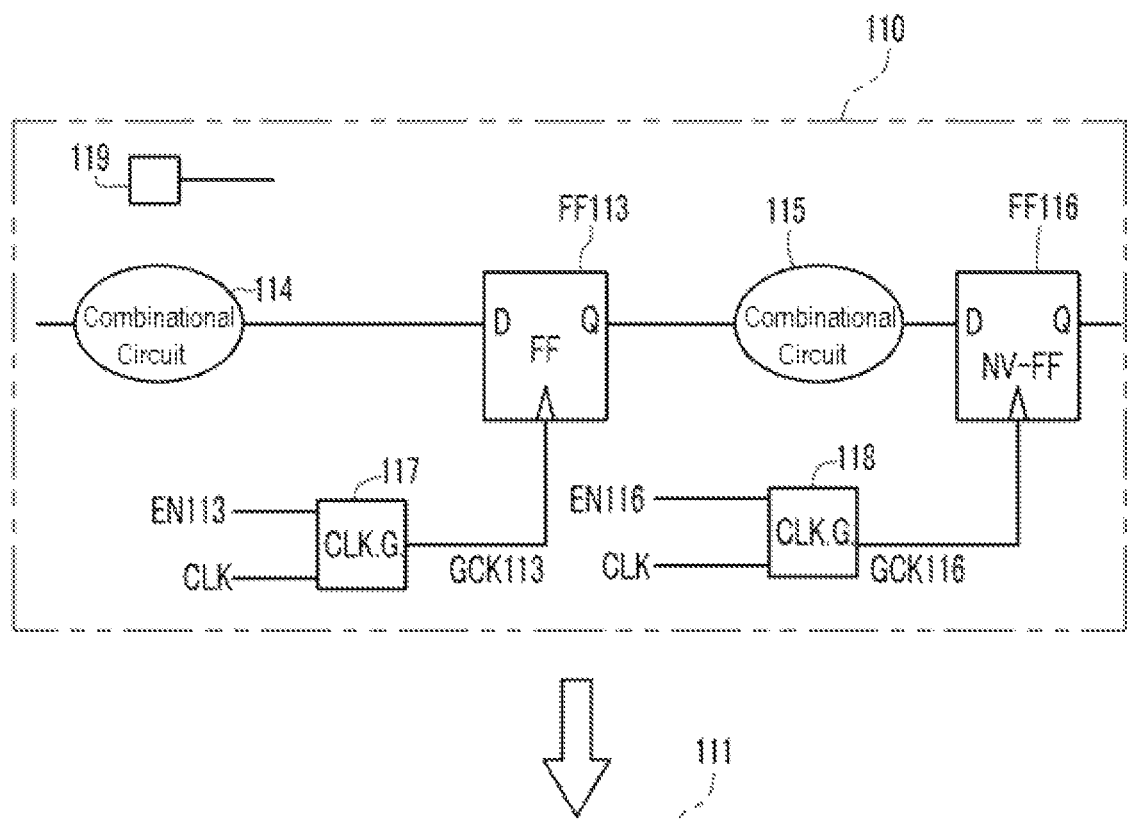
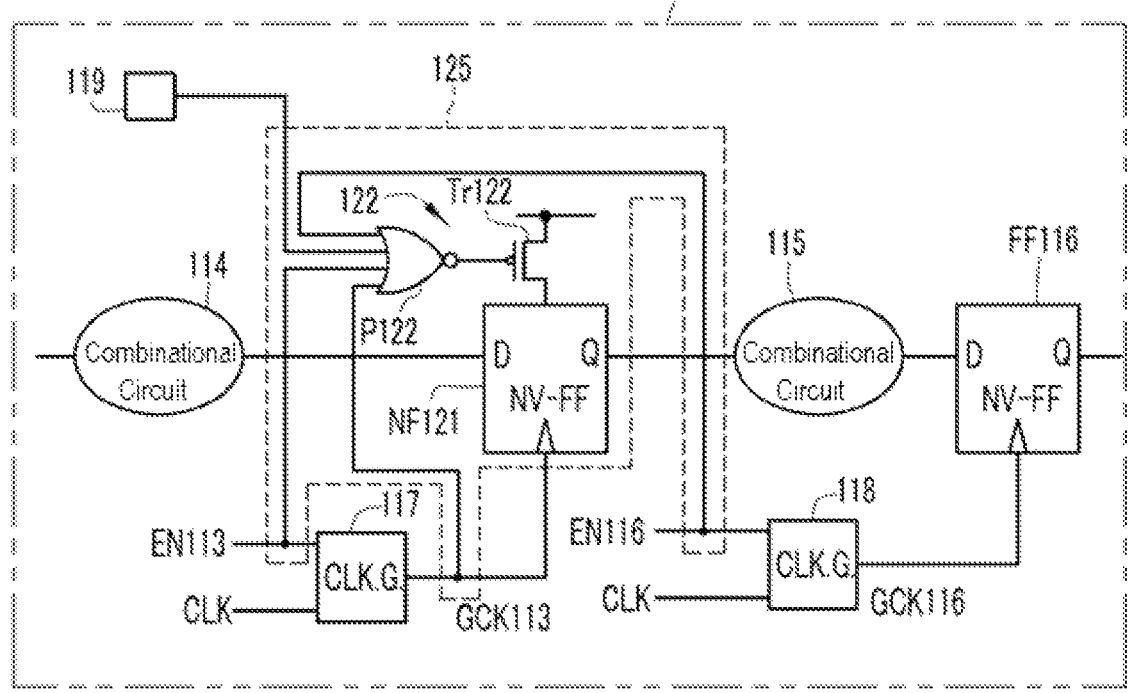

SEMICONDUCTOR CIRCUIT AND SUPPORT DEVICE FOR LOGIC CIRCUIT DESIGN

TECHNICAL FIELD

The present invention relates to a semiconductor circuit device and a logic circuit design support device.

BACKGROUND ART

Power gating, in which power supply to circuits that are not in use is stopped, is a known technique for suppressing leakage currents to reduce power consumption. Also, clock gating, in which the supply of a clock signal to circuits that are not in use is stopped, is a known technique for suppressing dynamic power consumption.

The semiconductor logic circuit device disclosed in Patent Document 1 (Japanese Patent Application Laid-Open Publication No. 2015-099451) has a plurality of circuit modules, each of which is provided with a clock gating circuit and a power gating circuit. Each circuit module includes two non-volatile flip-flops connected to the input side and the output side of a combinational circuit, with the output-side non-volatile flip-flop acquiring the result of the combinational circuit performing a logic operation on the data outputted from the input-side non-volatile flip-flop. The clock gating circuit and the power gating circuit of each circuit module has inputted thereto an enable signal for clock control (clock control signal) for the corresponding circuit module, resulting in power supply and the clock pulse being inputted to the circuit module when the enable signal is active. An arithmetic processing circuit provided in the semiconductor logic circuit device determines, for each circuit module, whether to activate or deactivate the clock signal by analyzing an operation program, and sets the enable signal to be active for circuit modules to be activated while setting the enable signal to be inactive for other circuit modules.

Meanwhile, a non-volatile latch and a non-volatile flip-flop that, as a result of a clock pulse of a prescribed pulse width or greater being inputted thereto, store the input data in a non-volatile manner, and automatically restore the input data with the resumption of power supply (see Non-Patent Document 1, Patent Document 2).

RELATED ART DOCUMENTS

Non-Patent Documents

Non-Patent Document 1 (T. Endoh, S. Togashi, F. Iga, Y. Yoshida, T. Ohsawa, H. Koike, S. Fukami, S. Ikeda, N. Kasai, N. Sakimura, T. Hanyu, and H. Ohno, "A 600 MHz MTJ-based nonvolatile latch making use of incubation time in MTJ switching", 2011 International Electron Devices Meeting, 2011, pp. 4.3.1-4.3.4, doi: 10.1109/IEDM.2011.6131487.

PATENT DOCUMENTS

Patent Document 1: Japanese Patent Application Laid-Open Publication No. 2015-099451
Patent Document 2: WO/2013/099536

SUMMARY OF THE INVENTION

Problems to be Solved by the Invention

If the computation processing circuit module disclosed in Japanese Patent Application Laid-Open Publication No. 2015-099451 is configured to differentiate, by circuit module, a non-volatile flip-flop and an acquisition circuit that directly or indirectly acquires data from the non-volatile flip-flop, which are controlled by different enable signals, and to analyze an operation program to control the enable signals of the non-volatile flip-flop circuits, this would increase the complexity of analysis. Also, if a generation circuit that generates enable signals is configured, the configuration of the generation circuit also becomes complex.

The present invention takes into consideration the above situation, and an object thereof is to provide a semiconductor circuit device and a logic circuit design support device by which it is possible to coordinate power source control of the non-volatile flip-flops with an acquisition circuit that is controlled by a different enable signal.

Means for Solving the Problems

In order to achieve the above-mentioned object, a semiconductor circuit device according to the present invention includes: a first clock gating circuit that is configured to output a first gated clock signal generated by controlling a clock signal according to a first enable signal that controls the clock signal so as to be active or inactive; a non-volatile first flip-flop that is configured to operate in response to a clock pulse of the first gated clock signal; an acquisition circuit to which data from the first flip-flop is inputted directly or via a combinational circuit, and that is configured to acquire data inputted according to a second enable signal that controls the acquisition of the data so as to be active or inactive; and a power gating circuit that has a power switch provided on a power source line to the first flip-flop, that has inputted thereto the first enable signal and the second enable signal as power source control signals, and that turns ON the power switch and supplies power to the first flip-flop when the first enable signal has a logical value that activates the clock signal or the second enable signal has a logical value that activates the acquisition of data.

A semiconductor circuit device according to the present invention includes: a first clock gating circuit that is configured to output a first gated clock signal generated by controlling a clock signal according to a first enable signal that controls the clock signal so as to be active or inactive; a convolution operation unit that, for each instance of calculating convolution operation result data that is element data of a following layer channel attained by performing a convolution operation on each convolution region of a plurality of channels of a previous layer, is configured to output the convolution operation result data such that the element data in a pooling region of the following layer channel is continuously and sequentially outputted; a pooling processing unit that has a register that, in a state where power is being supplied is configured to store in a non-volatile manner data being inputted due to input of a clock pulse of a prescribed pulse width or greater while operating as a flip-flop in response to a clock pulse of the first gated clock signal, and to store data by a plurality of non-volatile first flip-flops that output the data stored in a non-volatile manner when power supply is resumed, a comparator that compares the convolutional operation result data from the convolutional operation unit to stored data that is stored in the register, and a pooling selector to which the convolutional operation result data from the convolutional operation unit and the stored data are inputted, that selects data with a greater value among the inputted data on the basis of a comparison result of the comparator, and that stores the selected data as the new stored data in the register, the pooling processing unit being configured to output, to an acquisition circuit that acquires data inputted according to a second enable signal that controls acquisition of data so as to be active or inactive, the stored data that is stored by the register as pooling data after input of each piece of the convolutional operation result data of the pooling region for each of the pooling regions; a shutoff avoidance circuit in which either one of a shutoff avoidance mode for not shutting off a power source and a shutoff allowance mode for allowing shutoff of the power source is selected, and that is configured to output a shutoff avoidance signal of a logical value corresponding to the selected mode; a clock circuit having a clock signal generating unit that is configured to generate a first clock signal having a clock pulse of a prescribed pulse width or greater and a second clock signal having a narrower pulse width than the prescribed pulse width and having a higher frequency than the first clock signal, and a clock selector to which the first clock signal and the second clock signal are inputted, the clock selector being configured to select and output, as the clock signal, the first clock signal if the shutoff avoidance signal has a logical value corresponding to the shutoff allowance mode and the second clock signal if the logical value of the shutoff avoidance signal corresponds to the shutoff avoidance mode; a mode control unit that causes the shutoff avoidance circuit to select the shutoff allowance mode if an output interval of the convolution operation result data from the convolution operation unit is greater than or equal to a prescribed threshold, and causes the shutoff avoidance circuit to select the shutoff avoidance mode if the output interval is shorter than the prescribed threshold; and a power gating circuit that has a power switch provided on a power source line to the plurality of first flip-flops, that has inputted thereto the first enable signal, the second enable signal, and the shutoff avoidance signal as power source control signals, that maintains the power switch to be ON while the shutoff avoidance signal has a logical value corresponding to the shutoff avoidance mode and controls the power switch to be ON or OFF according to another of the power source control signals if the shutoff avoidance signal has a logical value corresponding to the shutoff allowance mode, and that turns ON the power switch and supplies power to the first flip-flop when the first enable signal has a logical value that activates the clock signal or the second enable signal has a logical value that activates the acquisition of data.

A logic circuit design support device according to the present invention includes: a substitution designation unit that is configured to designate a flip-flop to be substituted with a non-volatile flip-flop among flip-flops within a circuit coded in a netlist; and a logic circuit substitution unit that is configured to edit the netlist so as to add connections such that the flip-flop to be substituted is substituted with the non-volatile flip-flop to which a power gating circuit is added, and so as to input to the power gating circuit as power source control signals a first enable signal that controls, so as to be active or inactive, a clock signal inputted to a first clock gating circuit that is provided to the flip-flop to be substituted and that is configured to output a first gated clock signal generated by controlling the clock signal and a second enable signal that controls, so as to be active or inactive, acquisition of data by an acquisition circuit to which data from the flip-flop to be substituted is inputted directly or via a combinational circuit.

Effects of the Invention

According to a semiconductor circuit device of the present invention, the power supply is controlled by inputting, to the power gating circuit of a non-volatile first flip-flop, a first enable signal that controls a clock signal of the first flip-flop so as to be active or inactive, and a second enable signal of an acquisition circuit that acquires data from the first flip-flop directly or via a combinational circuit, and thus, it is possible to perform power source control of the first flip-flop with ease, in coordination with the acquisition circuit controlled by a different enable signal than the first flip-flop.

According to the logic circuit design support device of the present invention, it is possible to generate with ease a circuit configuration in which flip-flops that are not non-volatile and are controlled by a different enable signal are substituted with a non-volatile first flip-flop, and power source control is performed in coordination with the flip-flops that are not non-volatile.

BRIEF DESCRIPTION OF THE DRAWINGS

FIG. 27 is a descriptive drawing showing an example of substitution performed by the logic circuit design support device.

DETAILED DESCRIPTION OF EMBODIMENTS

Figure 1:
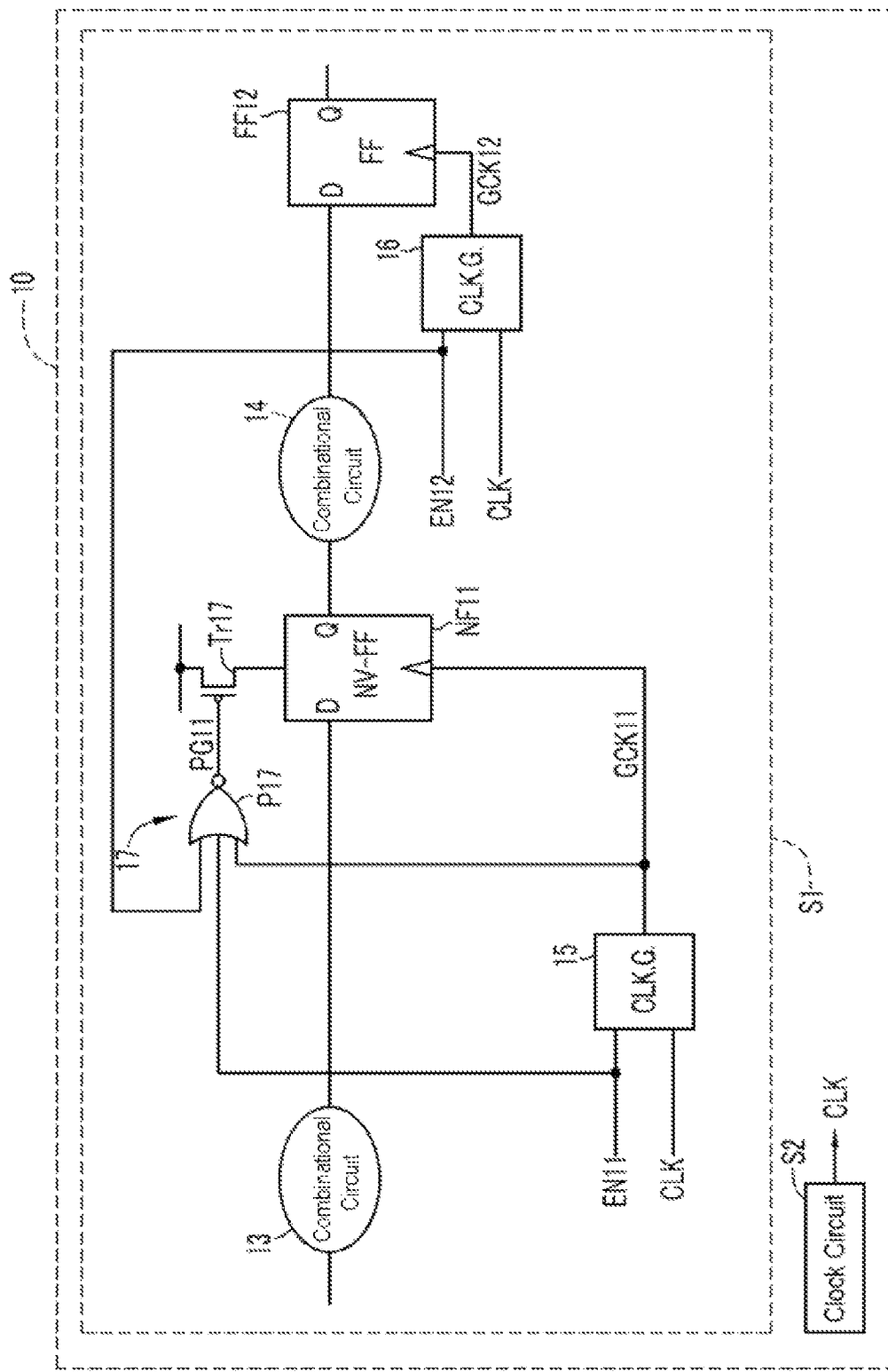
FIG. 1 is a circuit diagram of a semiconductor circuit device according to Embodiment 1.

In FIG. 1, a semiconductor circuit device 10 (hereinafter simply referred to as a circuit device) includes a logic circuit unit S1 constituted of various logic gates, sequential circuits, and the like, and a clock circuit S2 that is configured to generate and output a clock signal (hereinafter referred to as a CLK signal). The logic circuit unit 51 is constituted of a flip-flop NF11 (hereinafter referred to as a non-volatile flip-flop) having the function of storing data (logical value of "1" or "0") in a non-volatile manner, a flip-flop FF12, combinational circuits 13 and 14, clock gating circuits 15 and 16, a power gating circuit 17, signal generating circuits (not shown) that are configured to generate enable signals EN11 and EN12 to be described later, and the like. The logic circuit unit S1 receives input of the CLK signal and operates in synchronization therewith. The clock circuit S2 may be provided outside of the circuit device 10.

The non-volatile flip-flop NF11 as the first flip-flop is non-volatile, having the function of storing data in the flip-flop in a non-volatile manner as described above. The non-volatile flip-flop NF11 receives input of a clock pulse (in this example, the portion of the signal from rise to fall) of a prescribed pulse width or greater during an operation mode when power is supplied, thereby storing input data within the input in a non-volatile manner. The non-volatile flip-flop NF11 enters a state of outputting data stored in a non-volatile manner when power supply is resumed, or in other words, when transitioning from shutoff mode in which power supply is shut off to operation mode.

In this example, the non-volatile flip-flop NF11 typically operates in a substantially similar manner to a positive edge-type D flip-flop, but differs therefrom in terms of the timing at which the stored data is outputted. In other words, the non-volatile flip-flop NF11 stores data inputted to the D terminal (input terminal) as the clock pulse inputted to the CLK terminal rises, and outputs the stored data from the Q terminal (output terminal) after the clock pulse is inputted (after the fall of the signal).

In the non-volatile flip-flop NF11, the D terminal is connected to the combinational circuit 13 and the Q terminal is connected to the combinational circuit 14. As a result, the data from the combinational circuit 13 is inputted to the non-volatile flip-flop NF11 and the data outputted from the non-volatile flip-flop NF11 is inputted to the combinational circuit 14. A configuration may alternatively be adopted in which data from a circuit other than the combinational circuit is inputted to the non-volatile flip-flop NF11.

Also, in the non-volatile flip-flop NF11, the CLK terminal is connected to the clock gating circuit 15, and a gated clock signal GCK11 controlled by the clock gating circuit 15 is inputted thereto. As a result, the non-volatile flip-flop NF11 acquires the data from the combinational circuit 13 with the rise of the clock pulse of the gated clock signal GCK11 and outputs the data from the Q terminal. In other words, the non-volatile flip-flop NF11 operates in response to the clock pulse of the gated clock signal GCK11.

The combinational circuits 13 and 14 are circuits in which the outputted data is determined only by the inputted data, and the output does not depend on previous operations. Thus, the combinational circuits 13 and 14 are logic circuits in which inputted data or data outputted from a combination of inputted data is uniquely determined.

The flip-flop FF12 is the next stage of acquisition circuit from the non-volatile flip-flop NF11, and is a second flip-flop that acquires data from the non-volatile flip-flop NF11. The flip-flop FF12 in this example is a positive edge-type D flip-flop, and does not have the function that the non-volatile flip-flop NF11 has of storing data in a non-volatile manner. In the flip-flop FF12, the D terminal is connected to the combinational circuit 14 and data outputted from the combinational circuit 14 is inputted thereto.

Also, in the flip-flop FF12, the CLK terminal is connected to the clock gating circuit 16, and a gated clock signal GCK12 controlled by the clock gating circuit 16 is inputted thereto. As a result, the flip-flop FF12 stores the data from the combinational circuit 14 with the rise of the clock pulse of the gated clock signal GCK12 and outputs the stored data from the Q terminal. In other words, the flip-flop FF12 operates in response to the clock pulse of the gated clock signal GCK12, and acquires the data outputted from the non-volatile flip-flop NF11 via the combinational circuit 14. The Q terminal of the flip-flop FF12 is connected to the next stage circuit (not shown).

In this example, the flip-flop FF12 acquires data from the non-volatile flip-flop NF11 via the combinational circuit 14, but a configuration may be adopted in which the Q terminal of the non-volatile flip-flop NF11 is connected to the D terminal of the flip-flop FF12 and the flip-flop FF12 directly acquires the data outputted from the non-volatile flip-flop NF11. Also, as described later, the second flip-flop, which acquires data from the non-volatile flip-flop NF11, may be configured as a non-volatile flip-flop similar to the non-volatile flip-flop NF11.

The clock gating circuit 15 as the first clock gating circuit performs control of the CLK signal, or in other words, control for shutting off or allowing through the clock pulse of the CLK signal in response to the enable signal EN11 as the first enable signal that controls the CLK signal so as to be active or inactive, and supplies the CLK signal to the non-volatile flip-flop NF11. As a result of this clock gating control, dynamic power consumption in the non-volatile flip-flop NF11 is reduced. The clock gating circuit 15 has inputted thereto the enable signal EN11 and the CLK signal from the clock circuit S2, and outputs the gated clock signal GCK11 as the first gated clock signal attained by controlling the CLK signal according to the enable signal EN11.

Similarly, the clock gating circuit 16 as the second clock gating circuit performs controls the CLK signal in response to the enable signal EN12 as the second enable signal that controls the acquisition of data so as to be active or inactive, and reduces the dynamic power consumption of the flip-flop FF12. The clock gating circuit 16 has inputted thereto the enable signal EN12 and the CLK signal, and outputs the gated clock signal GCK12 as the second gated clock signal attained by controlling the CLK signal according to the enable signal EN12.

The enable signal EN11 is set to be active such that the clock pulse (rise) is inputted to the non-volatile flip-flop NF11 when the non-volatile flip-flop NF11 acquires data from the combinational circuit 13. Similarly, the enable signal EN12 is set to be active such that the clock pulse (rise) is inputted to the flip-flop FF12 when the flip-flop FF12 acquires data from the combinational circuit 14. The enable signals EN11 and EN12 are generated by the combinational circuits and the like, and the active/inactive timings thereof are controlled in synchronization with the CLK signal; in this example, the enable signals EN11 and EN12 are switched from inactive to active and from active to inactive during the period in which the CLK signal is at the H level. The enable signals EN11 and EN12 need only be established before the CLK signal rises, and need not necessarily change when the CLK signal is at the H level.

The enable signals EN11 and EN12 are signals that are independent of each other, and the non-volatile flip-flop NF11 and the flip-flop FF12 are circuits controlled by different enable signals from each other. The logical values of the enable signals EN11 and EN12 are described as active and inactive. Some of the other signals are also described as having logical values of active and inactive.

The power gating circuit 17 reduces the static power consumption of the non-volatile flip-flop NF11 by performing power gating on the non-volatile flip-flop NF11, or in other words, by shutting off power supply thereto. In this example, the power gating circuit 17 is constituted of a NOR gate P17 as a control circuit and a transistor Tr17 as a power switch. The transistor Tr17 is a p-type MOS transistor that is provided on a power source line so as to open or close the power source line that applies a power source voltage to the non-volatile flip-flop NF11, with the gate of the transistor Tr17 having connected thereto the output terminal of the NOR gate P17. The output from the NOR gate P17 is a switching signal PG11, and the transistor Tr17 is controlled so as to be ON/OFF by the switching signal PG11. When the switching signal PG11 is active (L level), the transistor Tr17 is turned ON and power is supplied to the non-volatile flip-flop NF11, and when the switching signal PG11 is inactive (H level), then the transistor Tr17 is turned OFF and the supply of power to the non-volatile flip-flop NF11 is shut off.

The enable signal EN11, the enable signal EN12, and the gated clock signal GCK11 are inputted as power source control signals to the NOR gate P17. The NOR gate P17 turns ON the transistor Tr17 when any one of the enable signals EN11 and EN12 and the gated clock signal GCK11 is active (H level) and the outputted switching signal PG11 is active (L level), and turns OFF the transistor Tr17 when all of the inputted signals are inactive (L level), with the switching signal PG11 being inactive (H level). In this example, the flip-flop FF12 is not subjected to power gating due to not being a non-volatile flip-flop.

The enable signal EN11 is primarily inputted to the NOR gate P17 in order to set the non-volatile flip-flop NF11 in the operation mode to acquire data from the combinational circuit 13. The enable signal EN12 is inputted to the NOR gate P17 in order to output data with the non-volatile flip-flop NF11 in the operation mode when the flip-flop FF12 acquires data from the non-volatile flip-flop NF11 via the combinational circuit 14.

Also, while the clock pulse of the gated clock signal GCK11 is being inputted, the non-volatile flip-flop NF11 inputs the gated clock signal GCK11 to the NOR gate P17 as the auxiliary signal for maintaining the operation mode. As a result, when the gated clock signal GCK11 rises as the enable signal EN11 is active, the transistor Tr17 is turned ON until the gated clock signal GCK11 falls regardless of the timing at which the enable signal EN11 becomes inactive. In this example, the clock gating circuit 15 is an auxiliary signal generation circuit that generates an auxiliary signal.

The clock circuit S2 generates and outputs the CLK signal. In this example, the pulse width of the clock pulse of the CLK signal outputted by the clock circuit S2 (the time during which the clock signal CLK is at the H level) is set to be greater than or equal to the time required for the non-volatile flip-flop NF11 to store the data in a non-volatile manner (hereinafter referred to as the rewrite requirement time). Thus, in the non-volatile flip-flop NF11, the data being inputted for every input of the clock pulse of the gated clock signal GCK11 is stored in a non-volatile manner.

Figure 2:
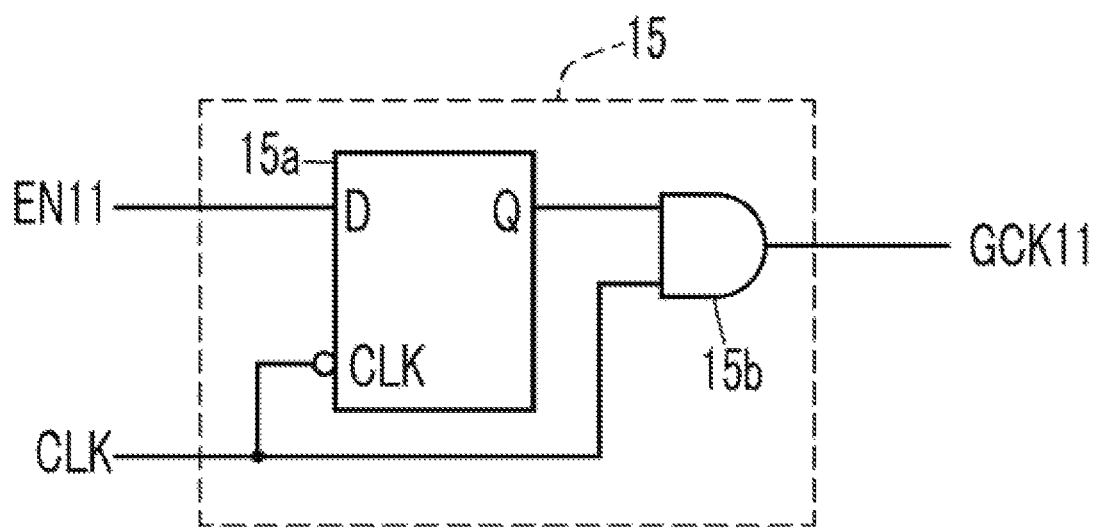
FIG. 2 is a circuit diagram showing a clock gating circuit.

In FIG. 2, the clock gating circuit 15 is constituted of an active low D-type latch 15a (hereinafter referred to as the active low latch) and an AND gate 15b. In the active low latch 15a, the enable signal EN11 is inputted to the input terminal thereof (D terminal) and the CLK signal is inputted to the CLK terminal thereof. An output signal from the output terminal (Q terminal) of the active low latch 15a and the CLK signal are inputted to the AND gate 15b. As a result, the gated clock signal GCK11 generated by performing gating control on the CLK signal according to the enable signal EN11 is outputted from the clock gating circuit 15.

The active low latch 15a maintains the signal level of the enable signal EN11 with the rise of the CLK signal and outputs a signal level that is maintained until the CLK signal is at the L level. Thus, if the CLK signal rises when the enable signal EN11 is active (H level), the active output signal can be acquired from the active low latch 15a from the rising edge to the falling edge of the CLK signal. By inputting the output signal of the active low latch 15a and the CLK signal to the AND gate 15b, it is possible to attain a clock pulse of the gated clock signal GCK11 having a complete pulse shape, or in other words, the same pulse shape as the CLK signal according to the enable signal EN11 entering the active state.

The clock gating circuit 16 has the same configuration as the clock gating circuit 15 and has inputted thereto the enable signal EN12 instead of the enable signal EN11. As a result, the clock gating circuit 16 outputs a clock pulse of the gated clock signal GCK12 having a complete pulse shape according to the enable signal EN12 entering the active state.

Figure 3:
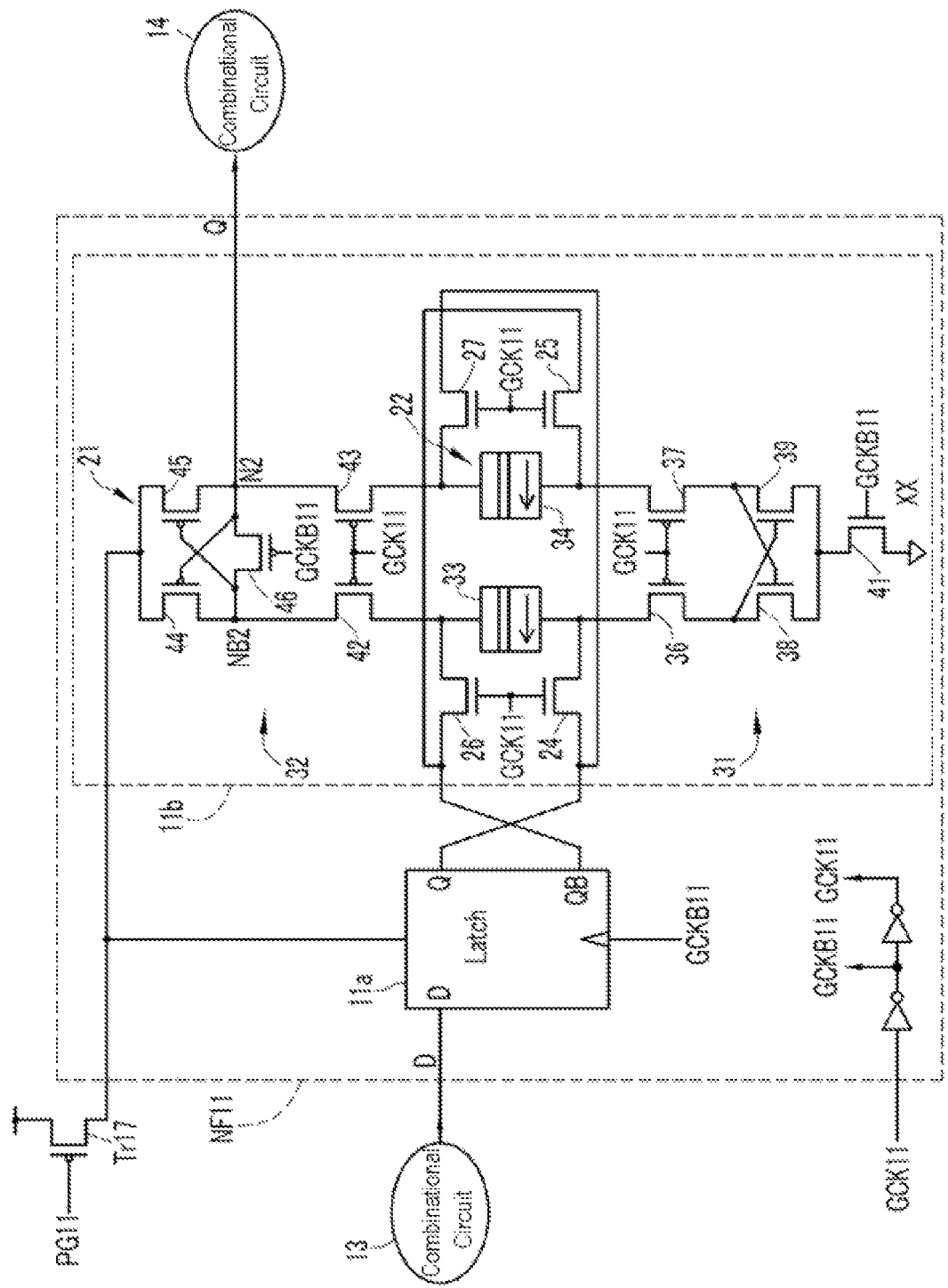
FIG. 3 is a circuit diagram showing the configuration of a non-volatile flip-flop.

FIG. 3 shows an example of a configuration of the non-volatile flip-flop NF11. The non-volatile flip-flop NF11 has a master/slave (leader/follower) configuration having a master latch 11a and a slave latch 11b. The master latch 11a is a D-type latch and the combinational circuit 13 is connected to the D terminal thereof. The master latch 11a has inputted to the CLK terminal thereof an inverted gated clock signal GCKB11 generated by inverting the gated clock signal GCK11.

As a result, when the gated clock signal GCK11 is at the L level (the inverted gated clock signal GCKB11 is at the H level), the master latch 11a outputs data inputted from the combinational circuit 13 as is from the Q terminal, and when the gated clock signal GCK11 is at the H level (the inverted gated clock signal GCKB11 is at the L level), the master latch 11a stores and outputs the data that had been outputted immediately prior thereto (that had been inputted from the combinational circuit 13). Data generated by inverting the data outputted from the Q terminal is outputted from a QB terminal of the master latch 11a.

The slave latch 11b is constituted of a basic circuit 21, a non-volatile storage circuit 22, transfer transistors 24 to 27 that are n-type MOSFETs, and the like. The basic circuit 21 is constituted of a first latch 31 and a second latch 32, and the non-volatile storage circuit 22 is constituted of MTJ (magnetic tunnel junction) elements 33 and 34.

The first latch 31 includes transistors 36 and 37 that are p-type MOSFETs, and transistors 38, 39, and 41 that are n-type MOSFETs. The source of the transistor 36 is connected to the source of the transfer transistor 24, and the drain of the transistor 36 is connected to the drain of the transistor 38. The source of the transistor 37 is connected to the source of the transfer transistor 25, and the drain of the transistor 37 is connected to the drain of the transistor 39. The sources of the transistors 38 and 39 are connected to the drain of the transistor 41. The gates of the transistors 36 and 37 have inputted thereto the gated clock signal GCK11. The gate of the transistor 38 is connected to the drain of the transistor 39, and the gate of the transistor 39 is connected to the drain of the transistor 38. The source of the transistor 41 is connected to ground, and the inverted gated clock signal GCKB11 is connected to the gate of the transistor 41.

The second latch 32 includes transistors 42 to 45 and 46 that are p-type MOSFETs. The drain of the transistor 42 is connected to the source of the transfer transistor 26, and the source of the transistor 42 is connected to the drain of the transistor 44. The drain of the transistor 43 is connected to the source of the transfer transistor 27, and the source of the transistor 43 is connected to the drain of the transistor 45. The sources of the transistors 44 and 45 are connected to the drain of the transistor Tr17 of the power gating circuit 17, and a power source voltage is applied via the transistor Tr17.

The gates of the transistors 42 and 43 have inputted thereto the gated clock signal GCK11. The gate of the transistor 44 is connected to a connection point N2 between the source of the transistor 43 and the drain of the transistor 45, and the gate of the transistor 45 is connected to a connection point NB2 between the source of the transistor 42 and the drain of the transistor 44. The connection point N2 is the output terminal (Q terminal) of the second latch 32, or in other words, of the non-volatile flip-flop NF11, and the potential of the connection point N2 is outputted as the output signal (data) of the non-volatile flip-flop NF11. Either one of the source and the drain of the transistor 46 is connected to the connection point N2 and the other is connected to the connection point NB2. The gate of the transistor 46 has inputted thereto the inverted gated clock signal GCKB11.

The drains of the transfer transistors 24 and 27 are connected to the Q terminal of the master latch 11a, and the drains of the transfer transistors 25 and 26 are connected to QB terminal of the master latch 11a. The gates of the transfer transistors 24 to 27 have inputted thereto the gated clock signal GCK11.

The MTJ elements 33 and 34 in this example are of a spin injection type, and have a structure in which a fixed magnetization layer in which the direction of magnetization is fixed and a free magnetization layer in which the direction of magnetization can be changed are stacked with an insulating film therebetween. In this example, the MTJ elements 33 and 34 are of an in-plane magnetization type in which the directions of magnetization of the fixed magnetization layer and the free magnetization layer are in the in-plane direction, but the MTJ elements 33 and 34 may be of a vertical magnetization type in which the directions of magnetization are perpendicular to the in-plane direction.

By passing a write current to the MTJ element 33 and 34 for a time greater than or equal to the rewrite requirement time, it is possible to change the direction of magnetization of the free magnetization layer, and the direction of magnetization is determined by the direction of the write current. The rewrite requirement time can be defined as the total of an incubation time from when the voltage applied to the MTJ elements 33 and 34 rises to when the inversion of the magnetization direction of the free magnetization layer of the MTJ elements 33 and 34 starts, and the transit time from start to end of the inversion in magnetization direction. The rewrite requirement time changes according to the applied voltage (size of the write current), but in this example, a constant voltage is applied and the rewrite requirement time is a prescribed constant value.

The MTJ elements 33 and 34 can be set to a parallel state in which the magnetization direction of the free magnetization layer matches the magnetization direction of the fixed magnetization layer, or an anti-parallel state in which the magnetization of the free magnetization layer is in the opposite direction to the magnetization direction of the fixed magnetization layer. The magnetization direction of the free magnetization layer is maintained while the write current is passed and until the direction of the write current is changed. As a result, it is possible to store, in a non-volatile manner, data ("1" or "0") in the MTJ elements 33 and 34 by controlling the MTJ elements to be in the parallel state or anti-parallel state. The MTJ elements 33 and 34 have a relatively low resistance when in the parallel state and have a relatively high resistance when in the anti-parallel state. The MTJ elements 33 and 34 enter the anti-parallel state by passing the write current from the fixed magnetization layer towards the free magnetization layer, and enter the parallel state by passing the write current from the free magnetization layer towards the fixed magnetization layer.

In the MTJ element 33, the fixed magnetization layer is connected to the source of the transfer transistor 24 and the free magnetization layer is connected to the source of the transfer transistor 26, and in the MTJ element 34, the fixed magnetization layer is connected to the source of the transfer transistor 25 and the free magnetization layer is connected to the source of the transfer transistor 27. Thus, the MTJ element 33 is connected between the transistor 36 of the first latch 31 and the transistor 42 of the second latch 32, and the MTJ element 34 is connected between the transistor 37 of the first latch 31 and the transistor 43 of the second latch 32. Also, the MTJ elements 33 and 34 are connected between the Q terminal and the QB terminal of the master latch 11a via the transfer transistors 24 to 27 so as to face opposite directions.

The operation of the non-volatile flip-flop NF11 will next be described. In a state where power is supplied via the transistor Tr17 that is turned ON, if the gated clock signal GCK11 is at the L level (the inverted gated clock signal GCKB11 is at the H level), the input data that is inputted from the combinational circuit 13 is outputted from the Q terminal of the master latch 11a and inverted input data generated by inverting the input data is outputted from the QB terminal. When the clock pulse of the gated clock signal GCK11 is inputted to the non-volatile flip-flop NF11, or in other words, when the gated clock signal GCK11 rises to the H level, the master latch 11a stores the input data at that time and outputs the same from the Q terminal and outputs from the QB terminal the inverted input data generated by inverting the stored input data.

In the slave latch 11b, the gated clock signal GCK11 is at the H level and the inverted gated clock signal GCKB11 is at the L level, and thus, the transfer transistors 24 to 27 turn ON, the transistors 36, 37, and 41 to 43 turn OFF, and the transistor 46 turns ON. Thus, the first latch 31 and the second latch 32 do not operate. Meanwhile, the MTJ element 33 enters a state in which the free magnetization layer thereof is connected to the QB terminal of the master latch 11a and the fixed magnetization layer thereof is connected to the Q terminal of the master latch 11a. Also, the MTJ element 34 enters a state in which the free magnetization layer thereof is connected to the Q terminal of the master latch 11a and the fixed magnetization layer thereof is connected to the QB terminal of the master latch 11a.

As a result, a voltage is applied to the MTJ elements 33 and 34 in a direction based on the input data and the write current flows therein. At this time, the directions of the applied voltages of the MTJ elements 33 and 34 are opposite to each other, and in one of the MTJ elements, the write current flows from the fixed magnetization layer towards the free magnetization layer and in the other MTJ element, the write current flows from the free magnetization layer towards the fixed magnetization layer.

The pulse width of the clock pulse of the gated clock signal GCK11 is greater than or equal to the rewrite requirement time, and thus, the write currents flow in the MTJ elements 33 and 34 for a time greater than or equal to the rewrite requirement time, and the magnetization directions of the MTJ elements 33 and 34 are based on the write currents. As a result, one of the MTJ elements 33 and 34 enters the parallel state and the other enters the anti-parallel state according to the input data, and the input data is written and then stored in a non-volatile manner in the non-volatile storage circuit 22.

If the input data is "1," then the Q terminal of the master latch 11a is at the H level and the QB terminal is at the L level. Thus, in the MTJ element 33, the write current flows from the fixed magnetization layer towards the free magnetization layer and in the MTJ element 34, the write current flows from the free magnetization layer towards the fixed magnetization layer. As a result, the MTJ element 33 enters the anti-parallel state and the MTJ element 34 enters the parallel state. On the other hand, if the input data is "0," then the Q terminal of the master latch 11a is at the L level and the QB terminal is at the H level, and thus, the write currents flow in the reverse directions in the MTJ elements 33 and 34 as compared to when the input data is "1." As a result, the MTJ element 33 enters the parallel state and the MTJ element 34 enters the anti-parallel state.

After writing is complete, when the gated clock signal GCK11 switches to the L level, the transfer transistors 24 to 27 and 46 are turned ON and the transistors 36, 37, and 41 to 43 are turned ON. As a result, the first latch 31 and the second latch 32 are activated. The input data that was inputted immediately prior is stored as a charge in the parasitic capacitors of the input nodes (the connection points between the MTJ elements 33 and 34 and the transfer transistors 24 to 27), and thus, the input data is latched to the first latch 31 and the second latch 32 due to the difference in the amount of charge regardless of the states of the MTJ elements 33 and 34. As a result, the input data that had been inputted until immediately prior is outputted from the non-volatile flip-flop NF11. Thus, when the input data immediately prior is "1," the connection point N2 is at the H level and "1" is outputted as data from the non-volatile flip-flop NF11. On the other hand, when the input data immediately prior is "0," the connection point N2 is at the L level and "0" is outputted as data from the non-volatile flip-flop NF11.

In the non-volatile flip-flop NF11, as described above, the input data when the clock pulse of the gated clock signal GCK11 rises is stored and outputted, and the input data is stored in a non-volatile manner in response to the input of the clock pulse having a pulse width greater than or equal to the rewrite requirement time.

If a clock pulse of the gated clock signal GCK11 having a pulse width shorter than the rewrite requirement time is inputted, then similar to the description above, the write currents flow in the MTJ elements 33 and 34 in directions according to the input data, but the magnetization direction of the free magnetization layer does not end up inverting, and therefore, does not change. Thus, non-volatile storage of input data does not occur. Even in this case, when the gated clock signal GCK11 switches to the L level, the difference in the amount of charge stored in the parasitic capacitors of the input nodes causes the input data to be latched to the first latch 31 and the second latch 32 regardless of the states of the MTJ elements 33 and 34, and thus, the input data inputted immediately prior is outputted from the non-volatile flip-flop NF11.

Next, the operation of the non-volatile flip-flop NF11 for when power supply is resumed will be described. As a result of the transistor Tr17 switching from OFF to ON in response to the enable signal EN11 or the enable signal EN12 becoming active, power supply to the non-volatile flip-flop NF11 is resumed.

As described above, the enable signals EN11 and EN12 change in synchronization with the CLK signal, and while the CLK signal is at the H level or the L level, the enable signals switch to being active, and thus, the gated clock signal GCK11 does not switch from inactive to active simultaneously to the enable signal EN11 or the enable signal EN12. In other words, when power supply to the non-volatile flip-flop NF11 is resumed, the clock pulse of the gated clock signal GCK11 is not inputted to the non-volatile flip-flop NF11. Thus, when the transistor Tr17 turns ON, the gated clock signal GCK11 reaches the L level and the inverted gated clock signal GCKB11 reaches the H level.

The gated clock signal GCK11 is at the L level and the inverted gated clock signal GCKB11 is at the H level, and thus, the transfer transistors 24 to 27 turn OFF, the transistors 36, 37, and 41 to 43 turn ON, and the transistor 46 turns OFF. As a result, the first latch 31 and the second latch 32 are activated.

When the above-mentioned writing is performed, one of the MTJ elements 33 and 34 has a high resistance (anti-parallel state) and the other has a low resistance (parallel state). Thus, a difference occurs between the current flowing in the circuits on the MTJ element 33 side of the activated first latch 31 and second latch 32 and the current flowing in the circuits on the MTJ element 34 side. As a result, there is a difference between the potentials of the gates of the transistors 38 and 39 of the first latch 31 and the gates (connection points N2, NB2) of the transistors 44 and 45 of the second latch 32, and the difference in potential is amplified by positive feedback of the first latch 31 and the second latch 32 and thus stabilized. At this time, the potential of the connection point on the path through which the larger current flows among the connection points N2 and NB2 is greater than the potential of the other connection point.

If, for example, the MTJ element 33 has a high resistance and the MTJ element 34 has a low resistance, the current flowing through the MTJ element 34 is greater than that flowing through the MTJ element 33 and the potential of the connection point N2 exceeds the potential of the connection point NB2, and thus, the connection point N2 stabilizes at the H level potential and the connection point NB2 stabilizes at the L level potential. As a result, the H level, or in other words, "1" is outputted as data from the non-volatile flip-flop NF11.

On the other hand, if the MTJ element 33 has a low resistance and the MTJ element 34 has a high resistance, the current flowing through the MTJ element 33 is greater than that flowing through the MTJ element 34 and the potential of the connection point NB2 exceeds the potential of the connection point N2, and thus, the connection point N2 stabilizes at the L level potential and the connection point NB2 stabilizes at the H level potential. As a result, the L level, or in other words, "0" is outputted as data from the non-volatile flip-flop NF11.

As described above, as a result of the resumption of power supply to the non-volatile flip-flop NF11, the data stored in a non-volatile manner in the non-volatile storage circuit 22 constituted of the MTJ elements 33 and 34 is restored and then stored in the basic circuit 21 constituted of the first latch 31 and the second latch 32, and the stored data is then outputted.

Details regarding the configuration and the like of the slave latch 11b including the MTJ elements 33 and 34 are disclosed in Non-Patent Document 1 and Japanese Patent Application Laid-Open Publication No. 2015-099451. Also, the configuration of the non-volatile flip-flop NF11 is one example, and may instead have the configuration disclosed in Japanese Patent Application Laid-Open Publication No. 2015-099451, for example.

Figure 4:
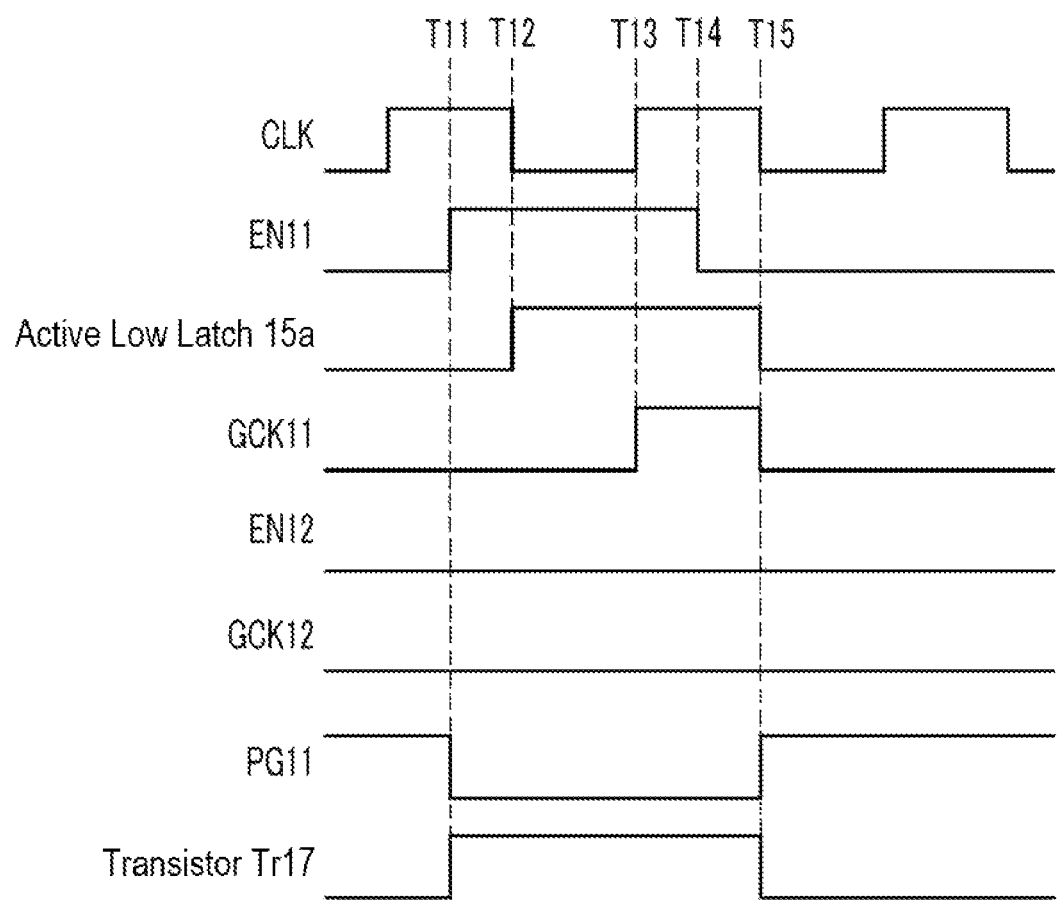
FIG. 4 is a timing chart showing the change in each signal when an enable signal for the non-volatile flip-flop is active.

In the circuit device 10 configured as described above, when the non-volatile flip-flop NF11 acquires data from the combinational circuit 13, the enable signal EN11 is set to active while the CLK signal is at the H level as shown in FIG. 4, for example, in a state where the data has been outputted from the combinational circuit 13 (time T11). As a result of the enable signal EN11 becoming active, the switching signal PG11 from the NOR gate P17 becomes active and the transistor Tr17 turns ON. As a result, the power supply to the non-volatile flip-flop NF11 is started.

While the enable signal EN11 is active, output from the active low latch 15a reaches the H level in response to the fall of the CLK signal (time T12). The H level output from the active low latch 15a continues until the enable signal EN11 becomes inactive and the CLK signal falls again while the enable signal EN11 is inactive.

As described above, when the CLK signal rises while the output from the active low latch 15a is at the H level (time T13), the gated clock signal GCK11 that is the output from the AND gate 15b becomes active (H level). Then, the enable signal EN11 becomes inactive while the CLK signal is at the H level (time T14), but during the period up to when the CLK signal falls next, the gated clock signal GCK11 maintains the H level until the time T15 when the CLK signal falls in order to maintain the output of the active low latch 15a at the H level. As a result, in synchronization with the rise of the CLK signal while the enable signal EN11 is active, the clock pulse of the gated clock signal GCK11 having the same pulse shape as the CLK signal is outputted from the clock gating circuit 15, and the clock pulse is inputted to the non-volatile flip-flop NF11.

When the clock pulse of the gated clock signal GCK11 is inputted to the non-volatile flip-flop NF11 as described above, the pulse width of the clock pulse is greater than or equal to the rewrite requirement time, and thus, the data inputted in the manner described above is stored in the non-volatile storage circuit 22 in a non-volatile manner. The gated clock signal GCK11 is also inputted to the NOR gate P17, and thus, during the period in which the clock pulse of the gated clock signal GCK11 is inputted, the transistor Tr17 remains ON. Thus, even if the enable signal EN11 were to switch to inactive during the writing period, power supply to the non-volatile flip-flop NF11 continues and data is written normally to the non-volatile storage circuit 22.

When the gated clock signal GCK11 switches to the L level (time T15), the signals inputted to the NOR gate P17 become inactive, and thus, the transistors Tr17 turns OFF and power supply to the non-volatile flip-flop NF11 is shut off.

Figure 5:
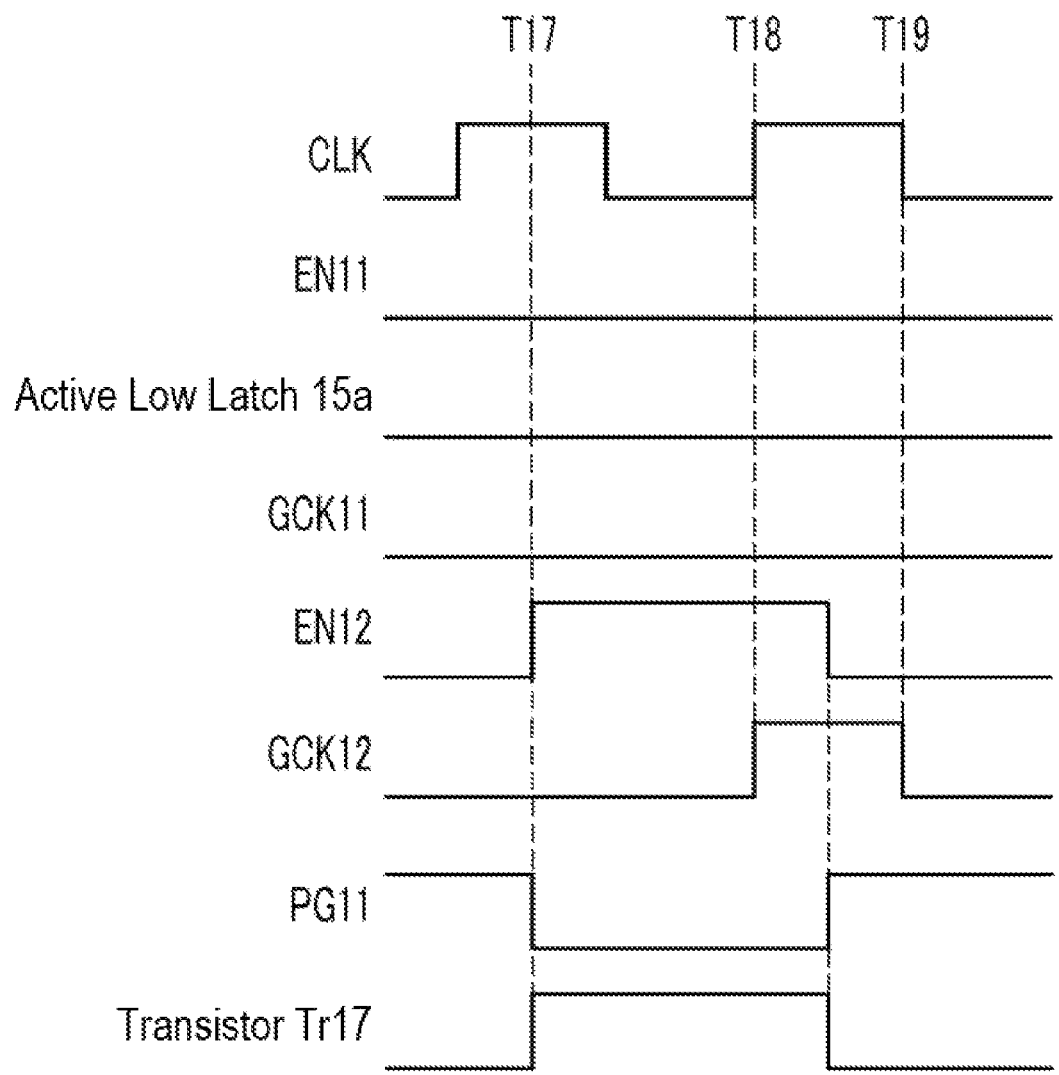
FIG. 5 is a timing chart showing the change in each signal when an enable signal for the next stage flip-flop is active.

If the flip-flop FF12 acquires data from the combinational circuit 14, then as shown in FIG. 5, the enable signal EN12 is set to active while the CLK signal is at the H, for example (time T17). As a result of the enable signal EN12 becoming active, the switching signal PG11 from the NOR gate P17 becomes active and the transistor Tr17 turns ON. As a result, the power supply to the non-volatile flip-flop NF11 is started.

When power supply is started, the gated clock signal GCK11 reaches the L level in the non-volatile flip-flop NF11, and thus, data written to the non-volatile storage circuit 22 immediately prior to the power supply being shut off is restored and then stored in the basic circuit 21 as described above, and the stored data is outputted to the combinational circuit 14. The data determined by the data inputted from the non-volatile flip-flop NF11 is inputted from the combinational circuit 14 to the flip-flop FF12.

In synchronization with the rise of the CLK signal while the enable signal EN12 is active, the clock pulse of the gated clock signal GCK12 having the same pulse shape as the CLK signal is inputted to the flip-flop FF12. As a result, in a state where the data determined by the data from the non-volatile flip-flop NF11 is outputted from the combinational circuit 14, the clock pulse of the gated clock signal GCK12 is inputted to the flip-flop FF2. The flip-flop FF12 acquires the data from the combinational circuit 14 with the rise of the clock pulse of the gated clock signal GCK12 (time T18).

As a result of the enable signal EN12 becoming inactive after the flip-flop FF12 acquires data, the transistor Tr17 turns OFF and power supply to the non-volatile flip-flop NF11 is stopped (transistor T19).

As described above, control of the power supply of the non-volatile flip-flop NF11 is performed using the enable signal EN11 for the non-volatile flip-flop NF11 as well as the enable signal EN12 for the flip-flop FF12 that is in the next stage from the non-volatile flip-flop NF11, and thus, the complexity is not increased for control of the enable signal EN11 or for the circuitry for this purpose. Also, control of the power supply of the non-volatile flip-flop NF11 is performed using the gated clock signal GCK11 as an auxiliary signal, and thus, normal operation for storing data in a non-volatile manner in the non-volatile flip-flop NF11 is performed without any inefficiency.

Figure 6:
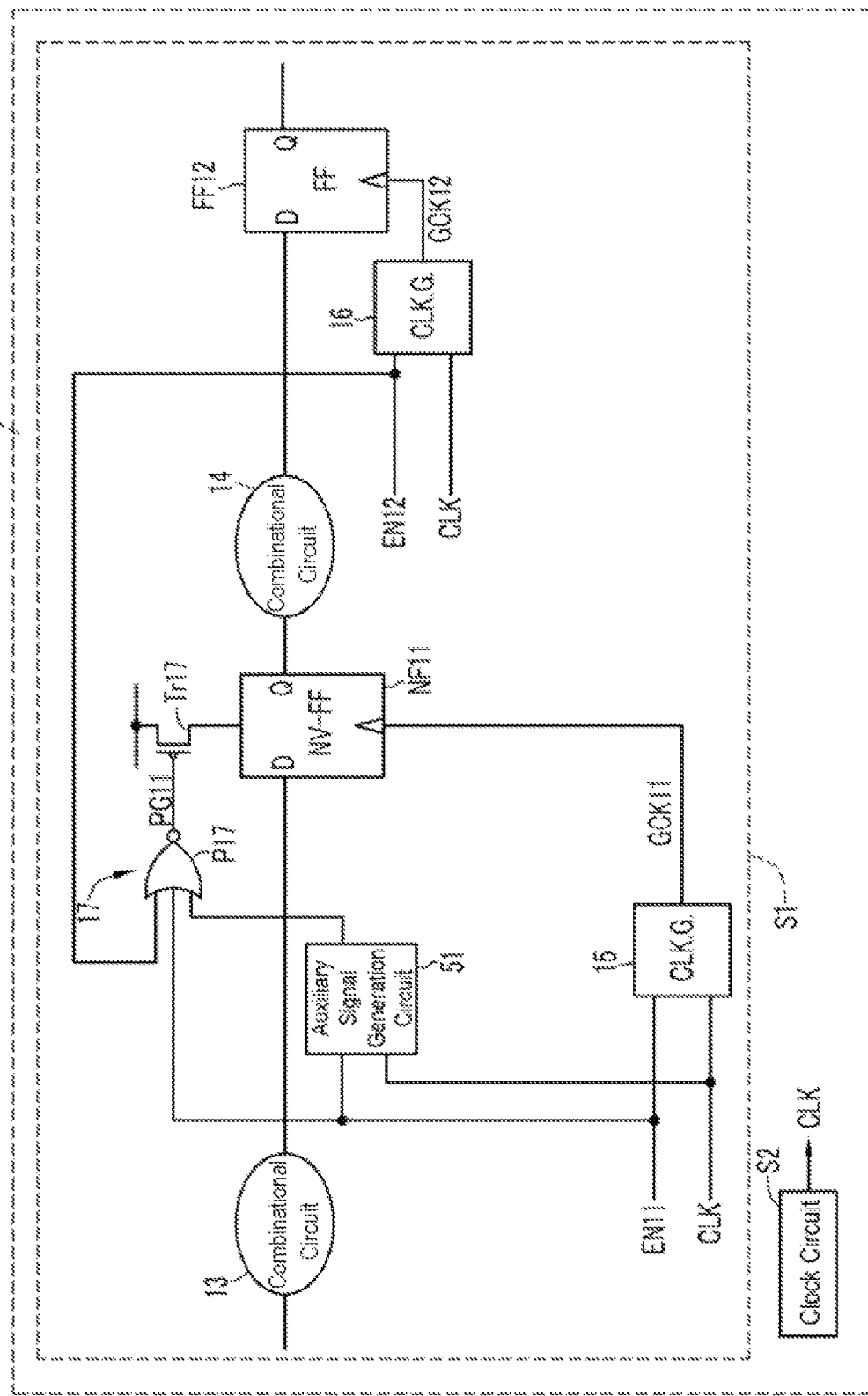
FIG. 6 is a circuit diagram showing an example in which an auxiliary signal generation circuit is provided.

FIG. 6 shows an example in which a circuit that generates an auxiliary signal is provided separate from the clock gating circuit. In this example, the logic circuit unit S1 is provided with an auxiliary signal generation circuit 51 that generates an auxiliary signal. The auxiliary signal generation circuit 51 generates, according to the CLK signal and the enable signal EN11, an auxiliary signal that is active (H level) at least while the clock pulse of the gated clock signal GCK11 is being inputted to the non-volatile flip-flop NF11 and inputs the auxiliary signal to the NOR gate P17.

Figure 7:
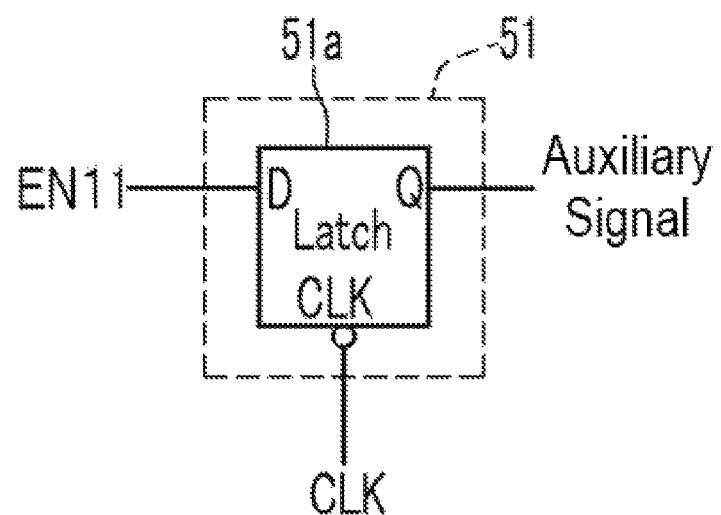
FIG. 7 is a circuit diagram showing an example in which the auxiliary signal generation circuit is constituted of an active low latch.

Specifically, as shown in FIG. 7, the auxiliary signal generation circuit 51 is constituted of an active low latch 51*a* that is a low active D-type latch. In the active low latch 51*a*, the enable signal EN11 is inputted to the input terminal thereof (D terminal) and the CLK signal is inputted to the CLK terminal thereof, and the output signal from the output terminal (Q terminal) is the auxiliary signal. Thus, the auxiliary signal outputted from the auxiliary signal generation circuit 51 is the same as that of the active low latch 15*a* of the clock gating circuit 15, and reaches the H level in response to the CLK signal falling while the enable signal EN11 is active, and the H level is maintained until the enable signal EN11 becomes inactive and the CLK signal falls while the enable signal EN11 is inactive. With this auxiliary signal as well, normal operation for storing data in a non-volatile manner in the non-volatile flip-flop NF11 is performed without any inefficiency.

The auxiliary signal generation circuit 51 may have the same circuit configuration as the clock gating circuit 15. Also, the output from the active low latch 15*a* of the clock gating circuit 15 may be the auxiliary signal.

Power gating can be performed using the same switching signal for a plurality of non-volatile flip-flops that use enable signals with the same logical value. In the example shown in FIG. 8, in addition to the non-volatile flip-flop NF11, non-volatile flip-flops NF11A and NF11B are provided, the non-volatile flip-flops NF11A and NF11B acquiring data from the combinational circuit 13 shared with the non-volatile flip-flop NF11 and respectively outputting data to the combinational circuit 14. The non-volatile flip-flops NF11, NF11A, and NF11B connected in this manner use the same enable signal EN11. Transistors Tr17A and Tr17B are respectively provided as power switches to the non-volatile flip-flops NF11A and NF11B. The transistor Tr17 and the transistors Tr17A and Tr17B of the non-volatile flip-flop NF11 are supplied the switching signal PG11 from one NOR gate P17.

Figure 8:
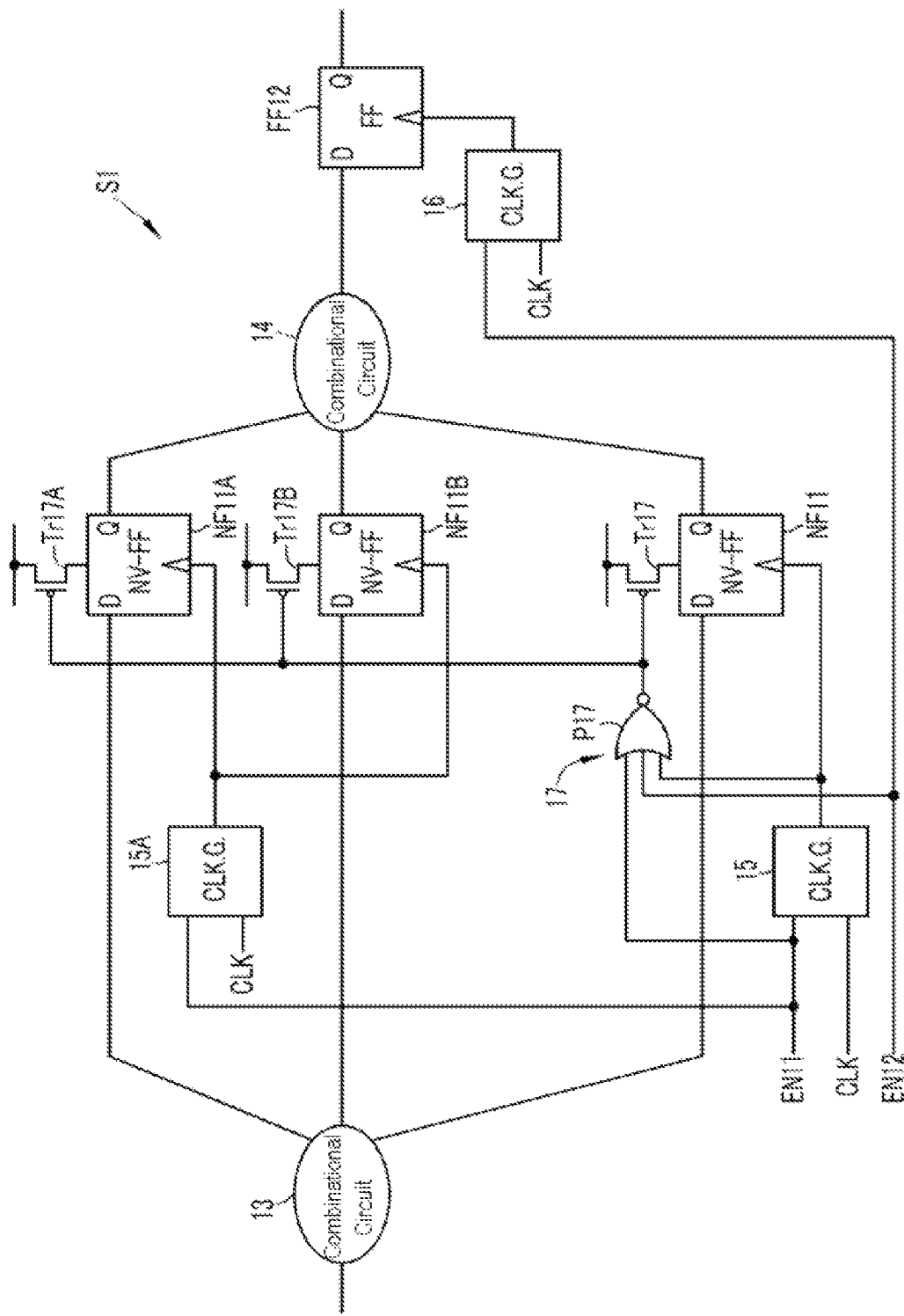
FIG. 8 is a circuit diagram showing an example in which the same switching signal is used for non-volatile flip-flops controlled by the same enable signal.
Figure 9:
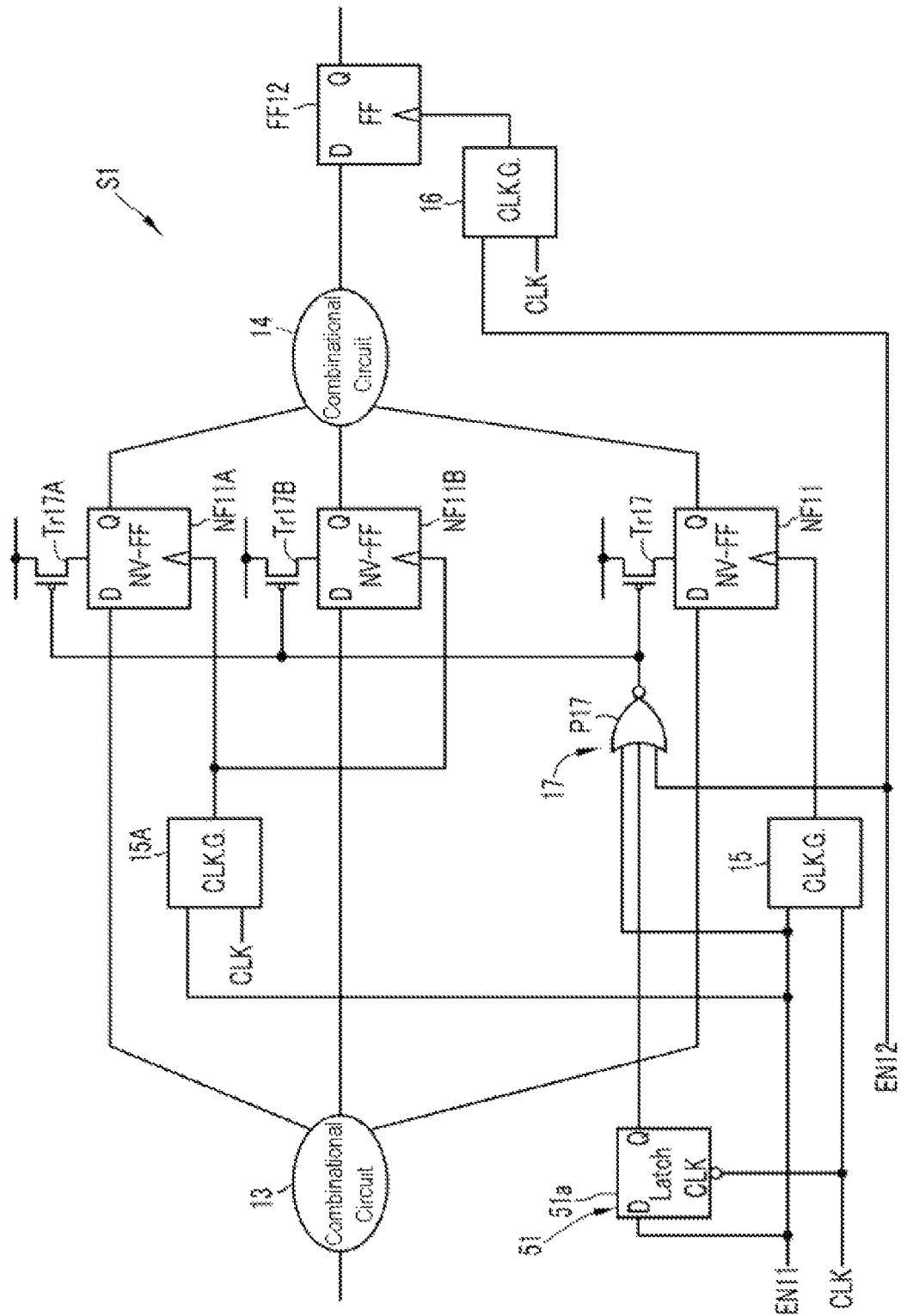
FIG. 9 is a circuit diagram showing an example where an auxiliary signal generation circuit is provided in a configuration in which the same switching signal is used for non-volatile flip-flops controlled by the same enable signal.

In the example of FIG. 8, a gated clock signal from a clock gating circuit 15A provided separately from the clock gating circuit 15 of the non-volatile flip-flop NF11 is supplied to the non-volatile flip-flops NF11A and NF11B, but a configuration may be adopted in which the gated clock signal GCK11 from the clock gating circuit 15 is inputted to the non-volatile flip-flops NF11, NF11A, and NF11B. Also, as shown in FIG. 9, a configuration may be adopted in which the auxiliary signal generation circuit 51 is provided separately from the clock gating circuit. In the example of FIG. 9, the active low latch 51*a* is used as the auxiliary signal generation circuit 51.

Figure 10:
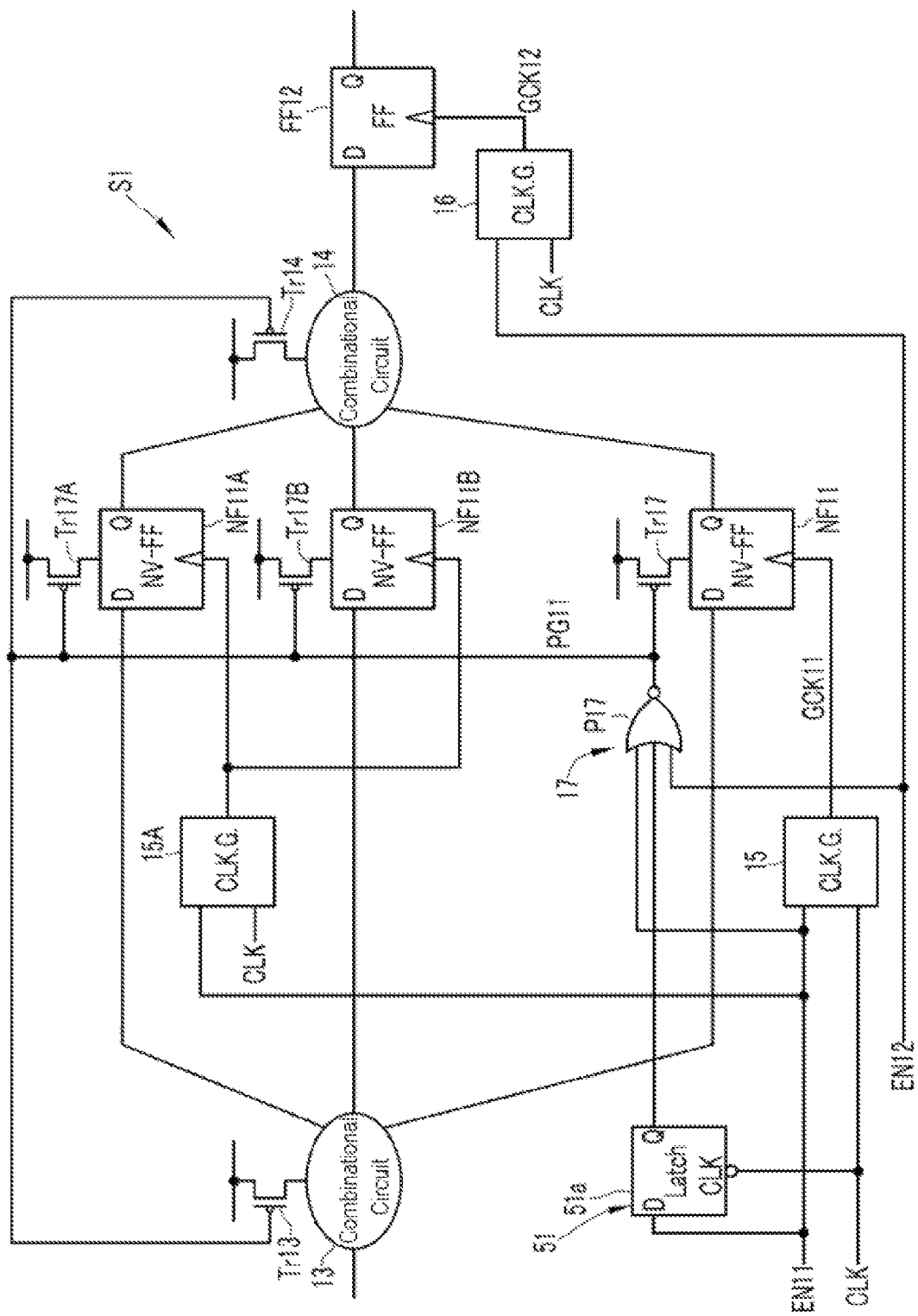
FIG. 10 is a circuit diagram showing an example in which power gating is performed on combinational circuits connected to the non-volatile flip-flop.

If the circuits connected to the input side or the output side of the combinational circuits are only non-volatile flip-flops using the same enable signal as the power source control signal, then power source control can be performed on the combinational circuits using the same switching signal as the non-volatile flip-flops. FIG. 10 shows an example of power source control on the combinational circuits using the same switching signal as the non-volatile flip-flops. The example of FIG. 10 is the same as that of FIG. 9 aside from the fact that power source control is performed on the combinational circuits 13 and 14.

As shown in FIG. 10, the combinational circuit 13 is provided with a transistor Tr13 as a power switch. Power supply or shut off to the combinational circuit 13 is determined by the transistor Tr13 being ON or OFF. Similarly, the combinational circuit 14 is provided with a transistor Tr14, and power supply or shut off to the combinational circuit 14 is determined by the transistor Tr14 being ON or OFF.

Only the non-volatile flip-flops NF11, NF11A, and NF11B are connected as output-side circuits of the combinational circuit 13, and the enable signals used as power source control signals for the non-volatile flip-flops NF11, NF11A, and NF11B are the enable signals EN11 and EN12. If power is not supplied to the non-volatile flip-flops NF11, NF11A, and NF11B, then there is no issue even if the combinational circuit 13 were not to output the data and even if the output from the combinational circuit 13 were undefined, and thus, power supply to the combinational circuit 13 may be shut off. The transistor Tr13 provided to the combinational circuit 13 is turned ON/OFF using a switching signal from the NOR gate P17 common to the non-volatile flip-flops NF11, NF11A, and NF11B to perform power source control on the combinational circuit 13.

Only the non-volatile flip-flops NF11, NF11A, and NF11B are connected as input-side circuits of the combinational circuit 14. The enable signals used as power source control signals for the non-volatile flip-flops NF11, NF11A, and NF11B are the enable signals EN11 and EN12. If power is not supplied to the non-volatile flip-flops NF11, NF11A, and NF11B, then there is no issue regarding input to the next stage circuit (in this example, the flip-flop FF12) even if the combinational circuit 14 were not to output the data and even if the output from the combinational circuit 14 were undefined, and thus, power supply to the combinational circuit 14 may be shut off. The transistor Tr14 provided to the combinational circuit 14 is turned ON/OFF using a switching signal from the NOR gate P17 common to the non-volatile flip-flops NF11, NF11A, and NF11B.

In the above example, the next stage flip-flop that acquires data from the non-volatile flip-flop is not non-volatile, but the next stage flip-flop may be a non-volatile flip-flop, and similar power source control can be performed for the next stage non-volatile flip-flop. In the example shown in FIG. 11, a non-volatile flip-flop NF53 is connected at the next stage to the non-volatile flip-flop NF11 with the combinational circuit 14 therebetween, and a non-volatile flip-flop NF55 is connected at the next stage to the non-volatile flip-flop NF53 with a combinational circuit 54 therebetween.

Similar to the clock gating circuit 15 and the power gating circuit 17 provided to the non-volatile flip-flop NF11, the non-volatile flip-flops NF53 and NF55 are provided with clock gating circuits 56 and 57 and power gating circuits 58 and 59. The clock gating circuits 56 and 57 and the power gating circuits 58 and 59 have a similar configuration to the clock gating circuit 15 and the power gating circuit 17, respectively, and the power gating circuits 58 and 59 are constituted of NOR gates P58 and P59 and transistors Tr58 and Tr59.

The clock gating circuit 56 generates a gated clock signal GCK53 from the enable signal EN53 for the non-volatile flip-flop NF53 and the CLK signal, and outputs the gated clock signal GCK53 to the non-volatile flip-flop NF53 and the power gating circuit 58. Similarly, the clock gating circuit 57 generates a gated clock signal GCK55 from the enable signal EN55 for the non-volatile flip-flop NF55 and the CLK signal, and outputs the gated clock signal GCK55 to the non-volatile flip-flop NF55 and the power gating circuit 59.

As power source control signals, the enable signal EN11, the enable signal EN53 for the non-volatile flip-flop NF53, and the gated clock signal GCK11 are inputted to the NOR gate P17 of the power gating circuit 17. As power source control signals, the enable signal EN53 and the gated clock signal GCK53 for the non-volatile flip-flop NF53 and the enable signal EN55 for the non-volatile flip-flop NF55 are inputted to the NOR gate P58 provided to the power gating circuit 58. As power source control signals, the enable signal EN55 and the gated clock signal GCK55 for the non-volatile flip-flop NF55 and the enable signal $EN_X$ of acquisition circuits such as the next stage flip-flip to the non-volatile flip-flop NF55 are inputted to the NOR gate P59 of the power gating circuit 59.

Figure 12:
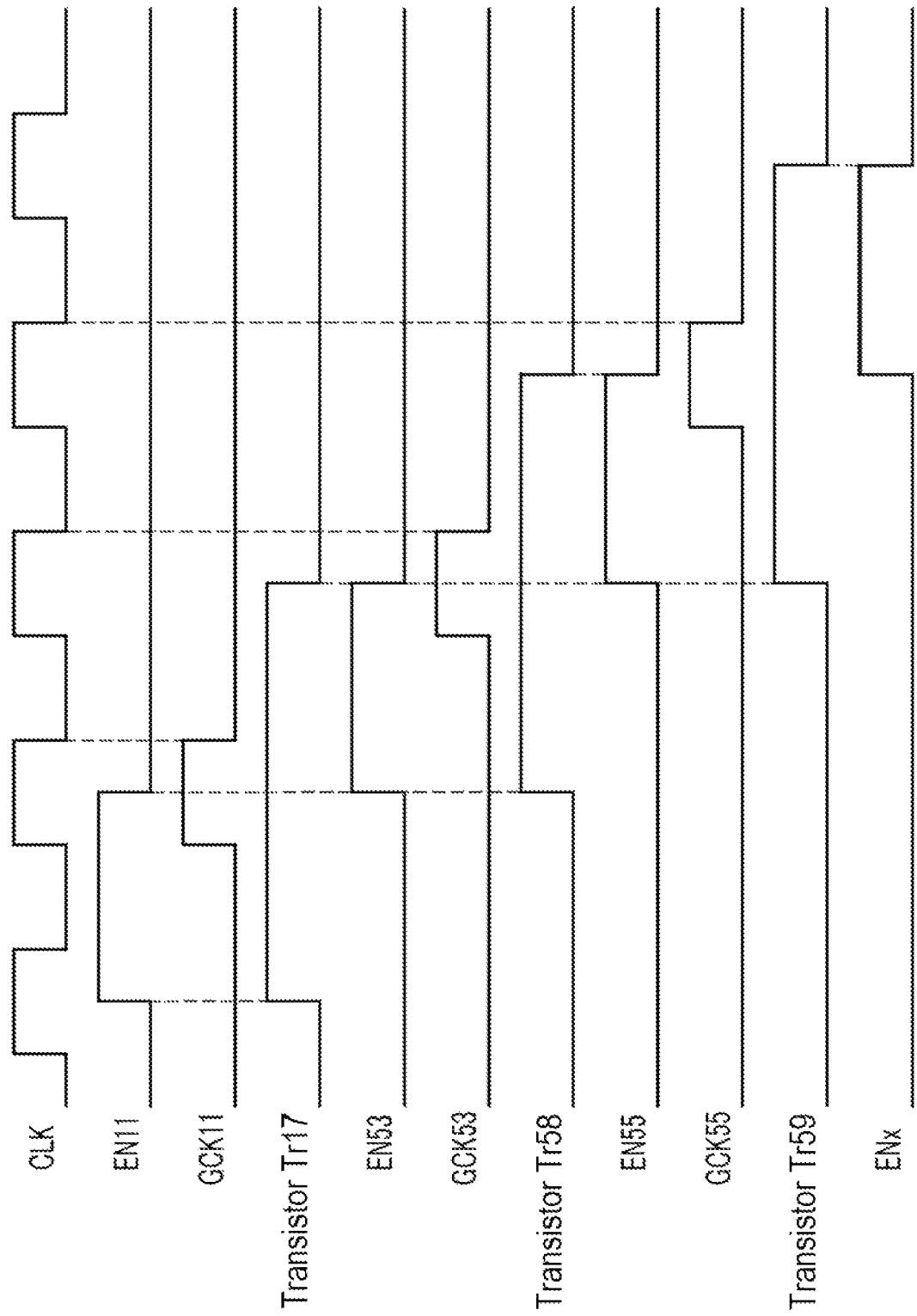
FIG. 12 is a timing chart showing an example of changes in each signal in the example of FIG. 11.

In the configuration above, power source control is performed on the non-volatile flip-flops NF11, NF53, and NF55 by enable signals to these non-volatile flip-flops as well as to next stage non-volatile flip-flops. FIG. 12 shows an example of changes in the signals. In this example, the enable signals EN11, EN53, and EN55 are controlled so as to be active while the CLK signal is at the H level, the enable signal EN53 rises almost simultaneously to the fall of the enable signal EN11, and the enable signal EN53 rises almost simultaneously to the fall of the enable signal EN53, thereby allowing the non-volatile flip-flops NF11, NF53, and NF55 to sequentially and consecutively acquire data.

Figure 13:
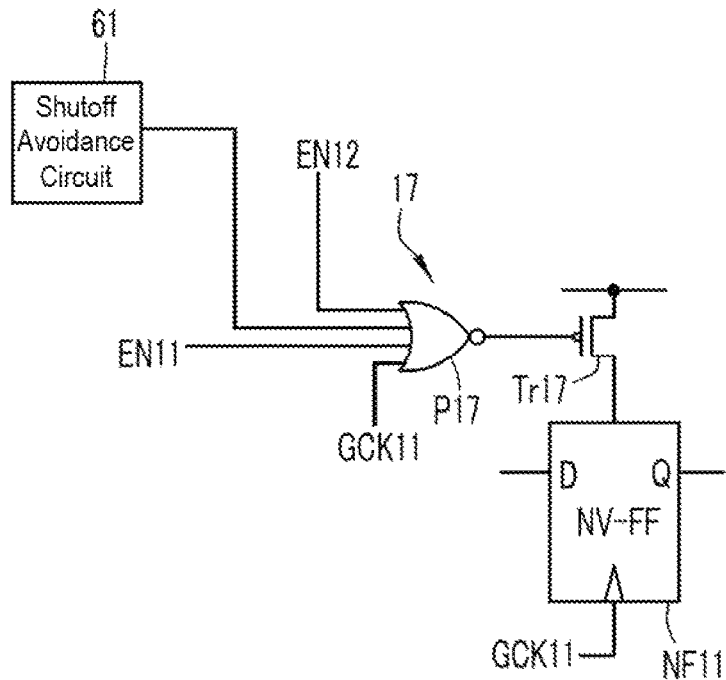
FIG. 13 is a circuit diagram showing an example in which a shutoff avoidance signal is inputted to the power gating circuit.

FIG. 13 shows an example in which a shutoff avoidance signal is inputted as one power source control signal. In the example of FIG. 13, a shutoff avoidance circuit 61 outputs a shutoff avoidance signal controlled such that the logical value thereof is active (H level) or inactive (L level), and the shutoff avoidance signal is inputted to the NOR gate P17 along with the enable signals EN11 and EN12 and the gated clock signal GCK11. The gated clock signal GCK11 is inputted as an auxiliary signal to the NOR gate P17, but an auxiliary signal from the auxiliary signal generation circuit may instead be inputted.

The shutoff avoidance circuit 61 is switched between shutoff avoidance mode and shutoff allowance mode, and if the shutoff avoidance mode is selected, the shutoff avoidance signal is set to active, and if the shutoff allowance mode is selected, the shutoff avoidance signal is set to inactive. Configurations for selecting between the shutoff avoidance mode and the shutoff allowance mode in the shutoff avoidance circuit 61 include a configuration in which the selection is made by a switch turned ON/OFF by manual operation, a configuration in which the selection is made automatically according to the operational state of a device or the like equipped with the circuit device 10 or the logic circuit device 10, the remaining power in a battery that serves as the power source, or the like.

If the shutoff allowance mode is selected and the shutoff avoidance signal is set to inactive, then similar to the examples above, power gating is performed on the non-volatile flip-flop NF11 by the enable signals EN11 and EN12 and the gated clock signal GCK11. On the other hand, if the shutoff avoidance mode is selected and the shutoff avoidance signal is set to active, then while the shutoff avoidance signal is active, the transistor Tr17 is turned ON regardless of the enable signals EN11 and EN12 and the gated clock signal GCK11, and thus, no power gating is performed and power supply is shut off.

Figure 14:
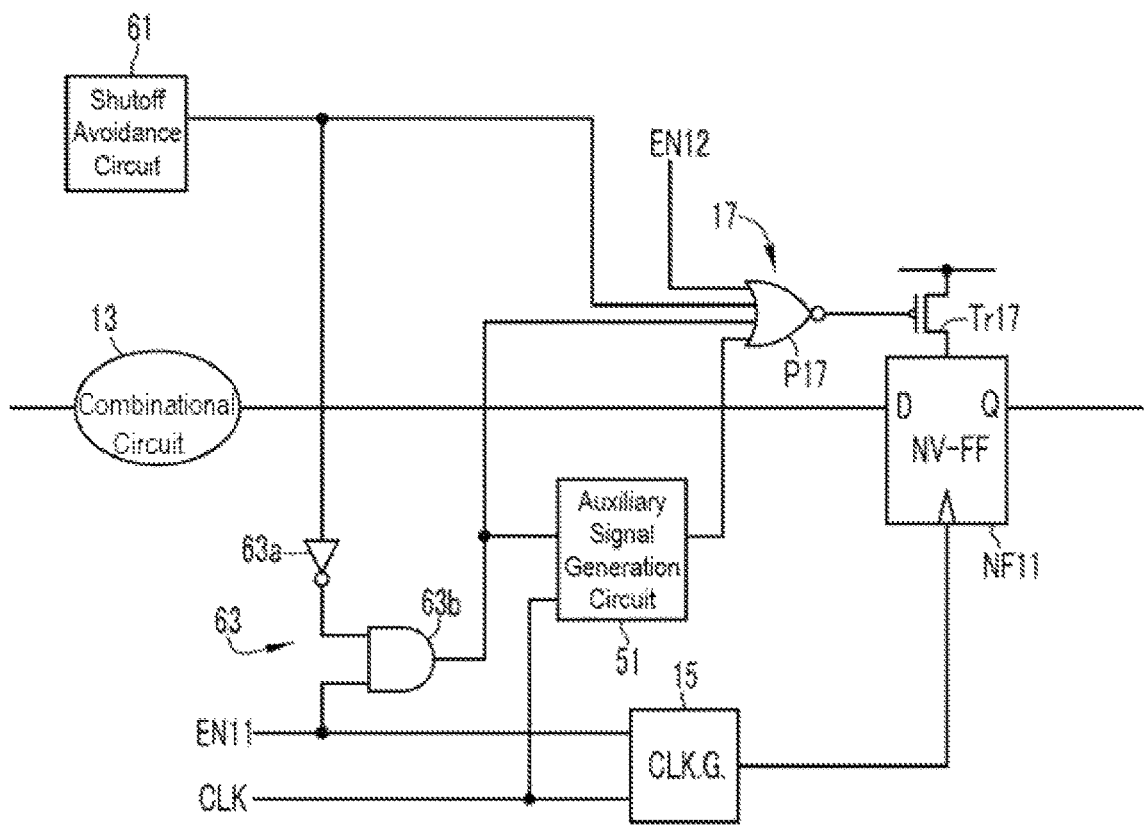
FIG. 14 is a circuit diagram showing an example in which changes in some signals are suppressed while the shutoff avoidance signal is active.

FIG. 14 shows an example in which dynamic power consumption is suppressed by always setting some of the power source control signals inputted to the NOR gate to be inactive during the period in which the shutoff avoidance signal is active. Aspects other than what is described below are similar to the example of FIG. 6.

In this example, a gating circuit 63 that gates the enable signal EN11 inputted to the NOR gate P17 and the auxiliary signal generation circuit 51 is provided. The gating circuit 63 is constituted of a NOT gate 63*a* and an AND gate 63*b*. The shutoff avoidance signal from the shutoff avoidance circuit 61 is inputted as one power source control signal to the NOR gate P17 and inputted to the AND gate 63*b* via the NOT gate 63*a*. Also, the enable signal EN11 is inputted to the clock gating circuit 15 and the AND gate 63*b*. The signal outputted from the AND gate 63*b* (hereinafter referred to as a gated enable signal GEN11) is inputted to the auxiliary signal generation circuit 51 and the NOR gate P17 instead of the enable signal EN11. The auxiliary signal generation circuit 51 may be constituted of the active low latch as described above may have the same configuration as the clock gating circuit.

According to this example, while the shutoff avoidance signal is active, the gated enable signal GEN11, which is the output from the AND gate 63*b*, is constantly maintained at the L level (inactive). As a result of the gated enable signal GEN11 being maintained in the inactive state, the auxiliary signal, which is the output from the auxiliary signal generation circuit 51, is maintained in the inactive state (L level). Thus, neither the gated enable signal GEN11 nor the auxiliary signal shift between the H level and the L level and dynamic power consumption can be suppressed.

While the shutoff avoidance signal is inactive, the gated enable signal GEN11 undergoes the same change as the EN1 signal, and thus, the power supply of the non-volatile flip-flop NF11 is controlled by the power gating circuit 17 in a manner similar to the above example.

Figure 15:
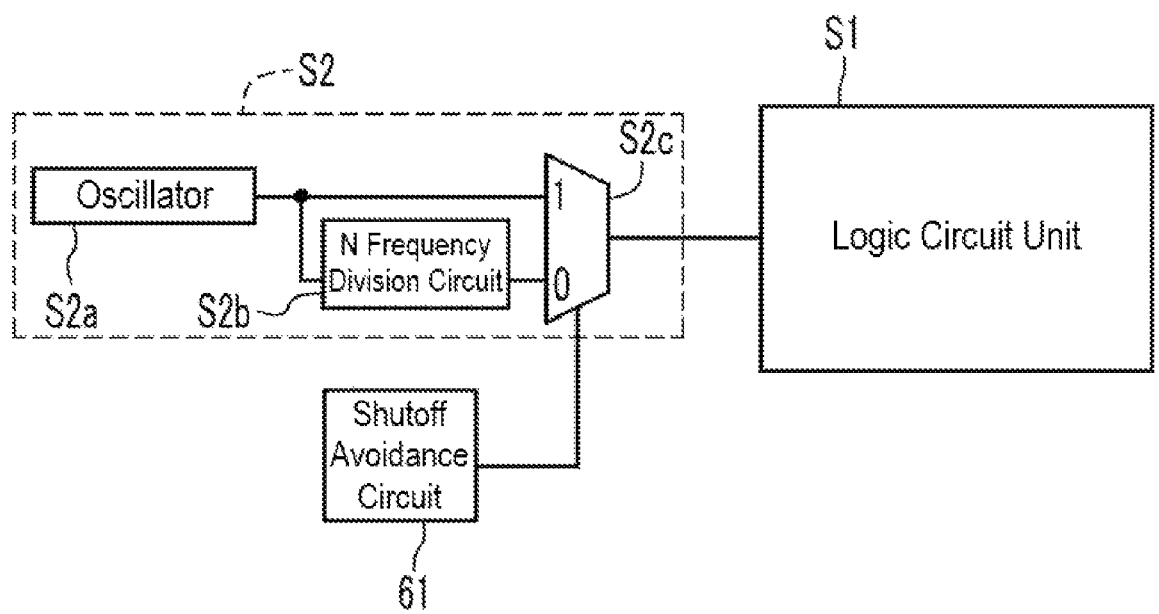
FIG. 15 is a block diagram showing an example in which the frequency of the clock signal is switched according to the shutoff avoidance signal.

FIG. 15 shows an example in which the frequency of the CLK signal is switched according to the shutoff avoidance signal. The clock circuit S2 in this example has an oscillator S2*a* and an N frequency division circuit S2*b* (frequency divider) that constitute a clock signal generator, and a selector S2*c*. The oscillator S2*a* generates a clock signal (hereinafter referred to as a CLK0 signal) at a constant frequency f. The pulse width of the CLK 0 signal is less than the rewrite requirement time. The N frequency division circuit S2*b* performs N frequency division on the CLK 0 signal, thereby generating a clock signal with a frequency of N·f with a pulse width greater than or equal to the rewrite requirement time (hereinafter referred to as a CLK 1 signal). In this example, the CLK 0 signal is the second clock signal and the CLK 1 signal is the first clock signal.

The selector S2*c* has inputted thereto the CLK 0 signal and the CLK 1 signal, and either one of the CLK 0 signal and the CLK 1 signal is selected according to the shutoff avoidance signal from the shutoff avoidance circuit 61 and outputted as the CLK signal. When the shutoff avoidance signal is active, the selector S2*c* selects the CLK 0 signal, and outputs the selected CLK 0 signal as the CLK signal. On the other hand, when the shutoff avoidance signal is inactive, the selector S2*c* selects the CLK 1 signal, and outputs the selected CLK 1 signal as the CLK signal. As a result, when not performing power gating on the non-volatile flip-flop in the logic circuit unit S1, the logic circuit unit S1 is operated at high speed with the CLK 0 signal having a relatively high frequency being used as the CLK signal, and when performing power gating, data is stored in a non-volatile manner in the non-volatile flip-flop within the logic circuit unit S1 with the CLK 1 signal having a relatively low frequency being used as the CLK signal. In other words, selecting between the shutoff avoidance mode and the shutoff allowance mode in the shutoff avoidance circuit 61 results in selection, for the logic circuit unit S1, between a high speed mode in which high speed operation is performed without power gating, and power saving mode in which power consumption is reduced while performing power gating, while operating at a lower speed than the high speed mode.

Figure 16A:
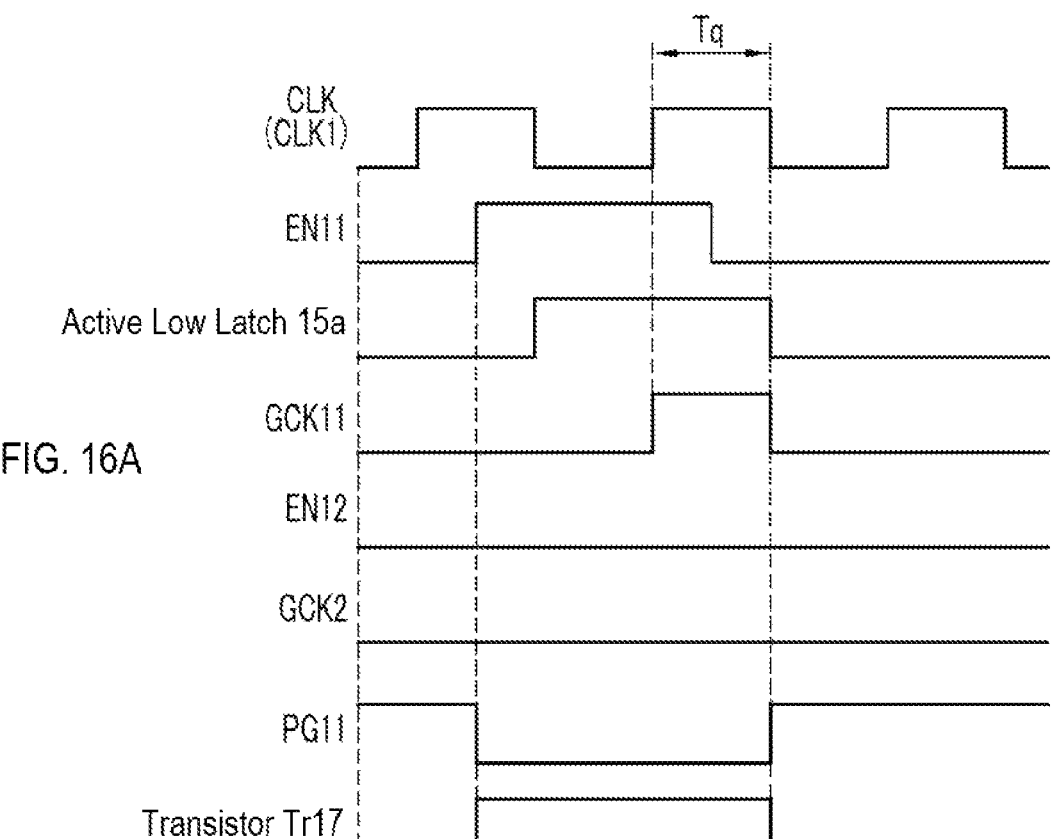
FIGS. 16A and 16B are timing charts showing an example of changes in each signal in the example of FIG. 15.
Figure 16B:
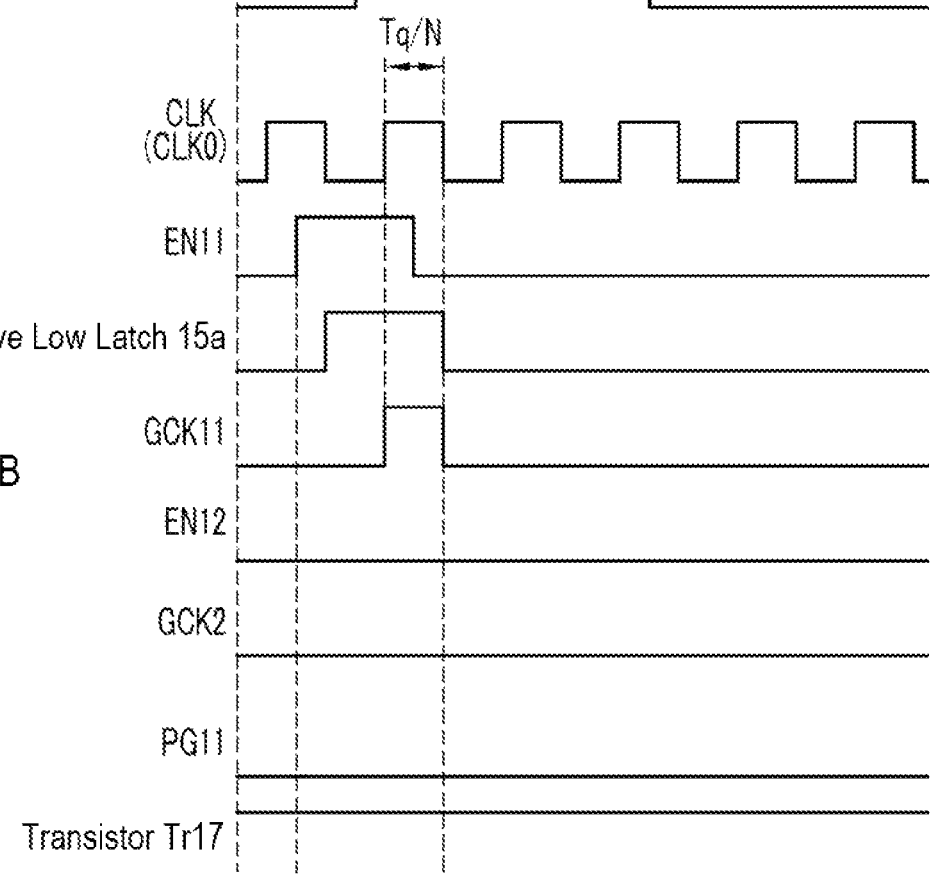

FIGS. 16A and 16B show an example of changes in the various signals when the non-volatile flip-flop acquires data from the combinational circuit depending on whether the shutoff avoidance signal is inactive or active. FIG. 16A shows a case where the shutoff avoidance signal is inactive and FIG. 16B shows a case where the shutoff avoidance signal is active. FIGS. 16A and 16B show a case where the logic circuit unit S1 has the circuit configuration shown in FIG. 1. In this example, the pulse width of the CLK 1 signal is the same as a rewrite requirement time Tq, and the pulse width of the CLK 0 signal is Tp/N, which is shorter than the rewrite requirement time. Thus, when the shutoff avoidance signal is inactive, the pulse width of the gated clock signal GCK11 is Tp and data is stored in a non-volatile manner in the non-volatile flip-flop, but when the shutoff avoidance signal is active, the pulse width of the gated clock signal GCK11 is Tp/N, and thus, data is not stored in a non-volatile manner in the non-volatile flip-flop. The relative timing of the change in the enable signals EN11 and EN12, the gated clock signal GCK11, and the like in relation to the CLK signal is the same regardless of whether the shutoff avoidance signal is active or inactive.

Figure 11:
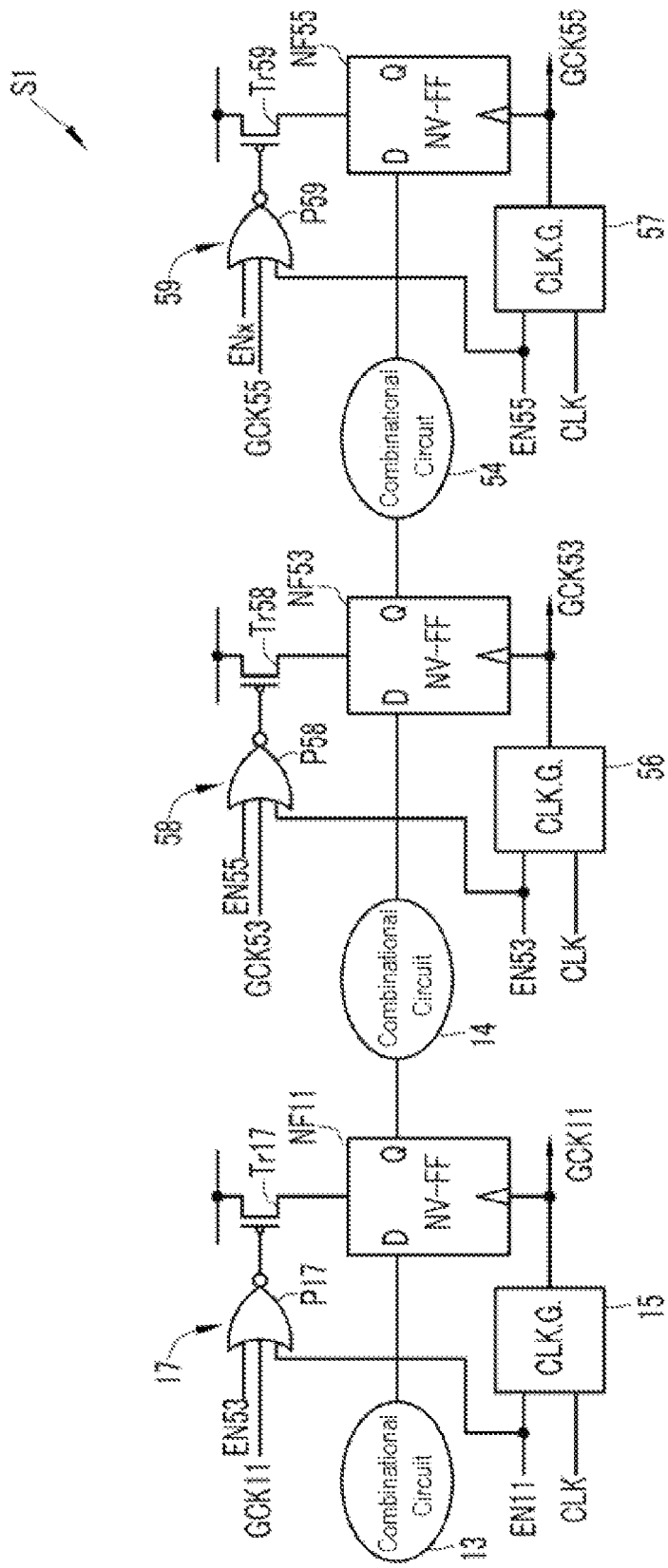
FIG. 11 is a circuit diagram showing an example in which a plurality of non-volatile flip-flops are provided, with combinational circuits therebetween.
Figure 17:
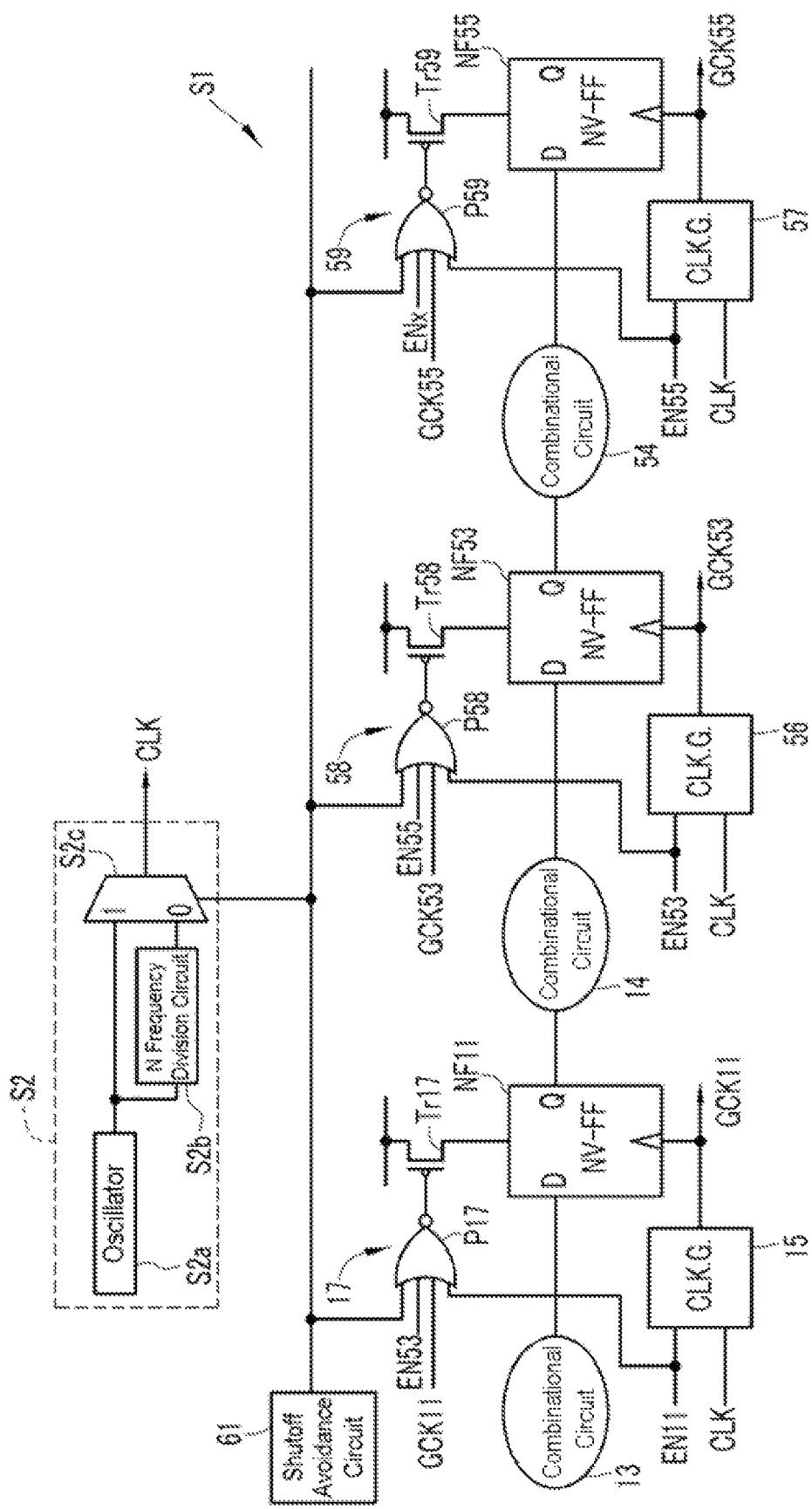
FIG. 17 is a circuit diagram showing an example of a configuration in which a plurality of non-volatile flip-flops are provided, with combinational circuits therebetween, where the frequency of the clock signal is switched according to the shutoff avoidance signal.
Figure 18:
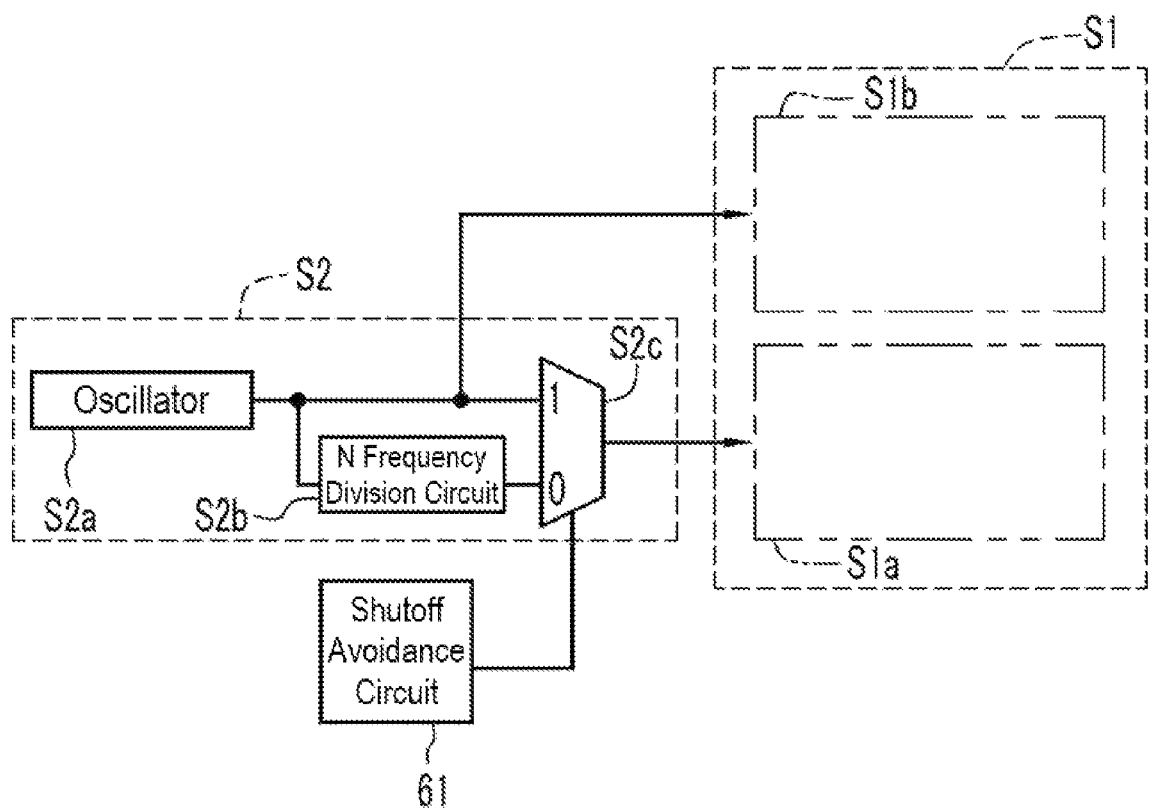
FIG. 18 is a circuit diagram showing an example in which a clock signal with a constantly high frequency is supplied to a circuit group that is constantly in high speed operation.

In the example of FIG. 15, there is no limitation on the circuit configuration of the logic circuit unit S1, and it is possible to use a similar circuit configuration for the logic circuit unit S1 as the example of FIG. 11, as shown in FIG. 17, for example. If, as shown in FIG. 18, a circuit group S1*a* that includes a non-volatile flip-flop and switches between the CLK 0 signal and the CLK 1 signal and a circuit group S1*b* that is always operated at high speed with only the CLK 0 signal are present in the logic circuit unit S1 as described above, then a configuration may be adopted whereby either one of the CLK 0 signal or the CLK 1 signal selected by the selector S2*c* is supplied to the circuit group S1*a*, and only the CLK 0 signal is supplied from the oscillator S2*a* to the circuit group S1*b* without any selection by the selector S2*c*.

Figure 19:
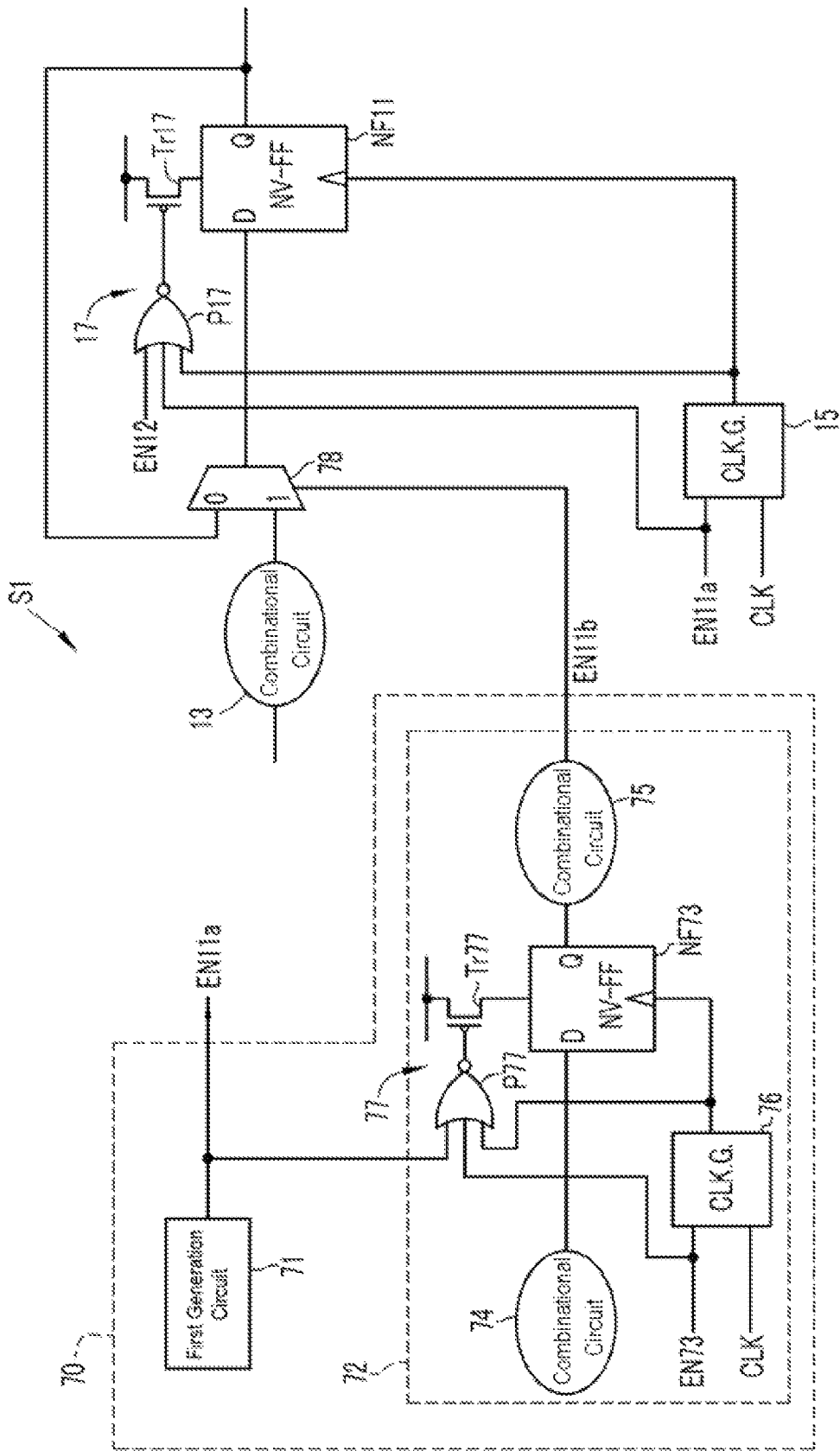
FIG. 19 is a circuit diagram showing an example in which power gating is performed on a non-volatile flip-flop in a circuit that generates an enable signal to a non-volatile flip-flop.

FIG. 19 is a circuit diagram showing an example in which power gating is performed on the non-volatile flip-flop (sometimes referred to below as control-side non-volatile flip-flop) in a circuit that generates an enable signal to the non-volatile flip-flop (sometimes referred to below as the controlled non-volatile flip-flop).

In this example, the first sub-enable signal EN11*a* is generated in a circuit that does not include a non-volatile flip-flop and therefore is not subjected to power gating, and the second sub-enable signal EN11*b* is generated in a circuit that includes the control-side non-volatile flip-flop to be subjected to power gating, so that the logical AND of the first sub-enable signal EN11*a* and the second sub-enable signal EN11*b* corresponds to the enable signal EN11 to the non-volatile flip-flop NF11 that is the controlled non-volatile flip-flop shown in the example of FIG. 1 and the like, and a circuit that performs clock gating on the non-volatile flip-flop NF11 using the enable signals or an equivalent circuit thereto is provided, and the first sub-enable signal EN11*a* is used as one power source control signal of the control-side non-volatile flip-flop.

The logic circuit unit S1 is provided with an enable signal generation circuit 70 that generates an enable signal on the non-volatile flip-flop NF11 as the controlled non-volatile flip-flop. The enable signal generation circuit 70 is provided with a first generation circuit 71 that generates the first sub-enable signal EN11*a* and a second generation circuit 72 that generates the second sub-enable signal EN11*b*.

The first generation circuit 71 is constituted of a circuit that does not include a non-volatile flip-flop, or in other words, a circuit that is not power gated. On the other hand, the second generation circuit 72 is constituted of a circuit that includes a non-volatile flip-flop NF73 as a control-side non-volatile flip-flop that is subjected to power gating. In other words, the enable signal generation circuit 70 is divided into the first generation circuit 71 that is not subjected to power gating and a second generation circuit 72 that includes the control-side non-volatile flip-flop that is subjected to power gating.

In the example shown, the second generation circuit 72 includes a combinational circuit 74 that is connected to the input side of the non-volatile flip-flop NF73 and a combinational circuit 75 that is connected to the output side, and the output signal of the combinational circuit 75 based on data outputted from the non-volatile flip-flop NF73 is the second sub-enable signal EN11*b*. Whether the second sub-enable signal EN11*b* is active or inactive is determined by the input to the combinational circuit 75, or in other words, the output from the non-volatile flip-flop NF73. If the power supply of the non-volatile flip-flop NF73 is shut off, then the output of the non-volatile flip-flop NF73 is an undefined value, and thus, the second sub-enable signal EN11*b* is also an undefined value. The second sub-enable signal EN11*b* is active when at the H level and inactive when at the L level, for example. The combinational circuit 75 may have a configuration in which, when the power supply of the non-volatile flip-flop NF73 is shut off, the second sub-enable signal EN11*b* that is the output thereof is active or inactive.

The second generation circuit 72 is provided with a clock gating circuit 76 corresponding to the non-volatile flip-flop NF73 and a power gating circuit 77. The clock gating circuit 76 has inputted thereto an enable signal EN73 from another circuit along with the CLK signal, and clock gating is performed on the non-volatile flip-flop NF73.

Similar to the power gating circuits described above, the power gating circuit 77 turns ON/OFF the transistor Tr77 on the basis of a power source control signal (enable signal power source control signal) inputted to a NOR gate P77 thereof, and controls power supply and shutoff of the non-volatile flip-flop NF73. The NOR gate P77 has inputted thereto the enable signal EN73 as the power source control signal and the gated clock signal GCK73 from the clock gating circuit 76 as the auxiliary signal, and also has inputted thereto the first sub-enable signal EN11*a* as the power source control signal.

In order to perform clock gating by the first sub-enable signal EN11*a*, the clock gating circuit 15 of the non-volatile flip-flop NF11 has inputted thereto the first sub-enable signal EN11*a* as the enable signal. Also, the NOR gate P17 of the power gating circuit 17 has inputted thereto the first sub-enable signal EN11*a*, the enable signal EN12 to the next stage flip-flop, and the gated clock signal GCK11 from the clock gating circuit 15.

In order to realize an equivalent logical function to the clock gating by the second sub-enable signal EN11*b*, a multiplexer 78 is provided as the selector. One input terminal of the multiplexer 78 is connected to the combinational circuit 13, and the other input terminal is connected to the Q output terminal of the non-volatile flip-flop NF11. Also, the multiplexer 78 has inputted thereto the second sub-enable signal EN11b as the selection control signal. The multiplexer 78 selects and outputs data (new data) from the combinational circuit 13 when the second sub-enable signal EN11b is active, and selects and outputs data from the Q output terminal of the non-volatile flip-flop NF11 when the second sub-enable signal EN11b is inactive. As a result, a circuit configuration is created such that when the second sub-enable signal EN11b is inactive, a feedback loop is created in which data stored by the non-volatile flip-flop NF11 remains stored as is, and only when the second sub-enable signal EN11b is active is the data from the combinational circuit 13 inputted to the non-volatile flip-flop NF11, thereby performing clock gating using the second sub-enable signal EN11b.

In this example, for the second sub-enable signal EN11b, a logical value (signal level) at which the multiplexer 78 selects data from the combinational circuit 13 and inputs the data to the non-volatile flip-flop NF11 is designated as active, and a logical value (signal level) forming the feedback loop is designated as inactive. Thus, the second sub-enable signal EN11b can also be configured such that the relationship between active and inactive, and the H level and L level can be the opposite to that described above.

According to this configuration, when the first sub-enable signal EN11a and the second sub-enable signal EN11b are active, power is supplied, and a clock pulse of the gated clock signal GCK11 is inputted to the non-volatile flip-flop NF11 to which data from the combinational circuit 13 was inputted. Thus, the data from the combinational circuit 13 is acquired by the non-volatile flip-flop NF11.

Also, when the first sub-enable signal EN11a is active in a state where the second sub-enable signal EN11b is inactive, a clock pulse of the gated clock signal GCK11 is inputted to the non-volatile flip-flop NF11 to which power was supplied as a result of the first sub-enable signal EN11a being active, and thus, the non-volatile flip-flop NF11 acquires the data being inputted. However, data stored by the non-volatile flip-flop NF11 is inputted to the non-volatile flip-flop NF11 itself via the multiplexer 78, and as a result, the data stored by the non-volatile flip-flop NF11 is maintained. Thus, a logical function equivalent to clock gating is realized.

In a state where the first sub-enable signal EN11a is inactive, the clock pulse of the gated clock signal GCK11 is not outputted from the clock gating circuit 15 regardless of whether the second sub-enable signal EN11b is active or inactive, and thus, even if power is supplied, the non-volatile flip-flop NF11 does not acquire new data and maintains the data already stored therein.

As described above, when both the first sub-enable signal EN11a and the second sub-enable signal EN11b are active, the result is the same as a configuration where clock gating is performed using an active enable signal.

Whether the second sub-enable signal EN11b is active or inactive is determined by the data stored in the non-volatile flip-flop NF73, but the non-volatile flip-flop NF73 is subject to power source control, and thus, if power supply thereof is shut off, a normal second sub-enable signal EN11b cannot be attained.

However, in the enable signal generation circuit 70 configured as described above, the first sub-enable signal EN11a is inputted to the NOR gate P77 as a power source control signal, and thus, when at least the first sub-enable signal EN11a is active, power is supplied to the non-volatile flip-flop NF73, and the combinational circuit 75 generates and outputs a normal second sub-enable signal EN11b according to the data stored in the non-volatile flip-flop NF73. Acquisition of data by the non-volatile flip-flop NF11 is controlled as described above according to whether the second sub-enable signal EN11b is active or inactive in a state where the first sub-enable signal EN11a is active.

On the other hand, when the first sub-enable signal EN11a is inactive, whether power is supplied to the non-volatile flip-flop NF73, or in other words, whether a normal second sub-enable signal EN11b is generated depends on power source control signals other than the first sub-enable signal EN11a inputted to the NOR gate P77. However, when the first sub-enable signal EN11a is inactive, the clock pulse of the gated clock signal GCK11 is not inputted to the non-volatile flip-flop NF11, as described above. Thus, even if a normal second sub-enable signal EN11b were not generated, or in other words, regardless of whether the second sub-enable signal EN11b is active or inactive, the non-volatile flip-flop NF11 does not acquire and store inputted data, and thus, there is no problem posed.

In a configuration in which an enable signal that is active when both the first sub-enable signal EN11a and the second sub-enable signal EN11b are active is used as one power source control signal to perform power gating on the control-side non-volatile flip-flop, the control-side non-volatile flip-flop is involved in power source control of the control-side non-volatile flip-flop itself, and thus, the enable signal is not correctly generated. However, by the above configuration, power gating of the non-volatile flip-flop NF73 within the enable signal generation circuit 70 involved in the operation of the non-volatile flip-flop NF11 can be performed with ease.

In the configuration of this example, circuit configurations of the above examples can be used.

In the above examples, the next stage acquisition circuit is a flip-flop, but as long as acquisition of data is controlled by the enable signal, a latch other than a flip-flop, a memory, or another circuit may be used. Also, the enable signal to the acquisition circuit need not control the CLK signal.

Embodiment 2

Embodiment 2 is an example of a circuit device that performs a convolution operation used in a convolutional neural network and a pooling process on the results of the convolution operation. Members that are substantially the same as those Embodiment 1 are assigned the same reference characters and detailed descriptions thereof are omitted.

Figure 20:
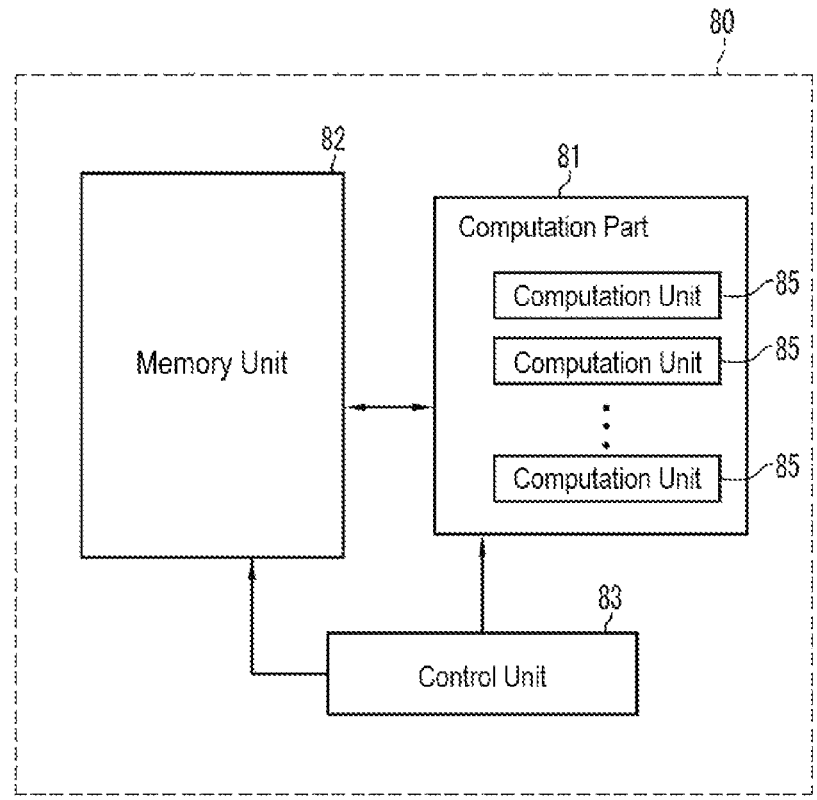
FIG. 20 is a block diagram that schematically shows a semiconductor circuit device that performs a convolution operation and a pooling process according to Embodiment 2.

In FIG. 20, the circuit device 80 performs a convolution operation process and a pooling process using a convolution filter on a channel (also referred to as a feature plane) on the basis of a convolutional neural network. The circuit device 80 has a computation part 81, a memory unit 82, and a control unit 83.

The computation part 81 is provided with k (k being an integer of 2 or greater) computation units 85 that perform a convolution operation process and pooling process using a convolution filter. The memory unit 82 stores weight data of the convolution filter and element data (also referred to as pixels) of each channel of a layer to which the convolution operation process is applied, and has written thereto the convolution operation result data and the pooling data, or in other words, the element data of the channels of the layers generated by the convolution operation process and pooling process. The layer subjected to the pooling process is not written to the memory unit 82 due to the element data attained by the convolution operation being handed over to the pooling process inside the computation units 85. The control unit 83 controls the computation units 85 and the memory unit 82.

The convolutional neural network on which the circuit device 80 is based has a plurality of connected layers. Each layer has one or more channels. The first layer is an input layer and is an image or the like constituted of RGB channels, for example.

Figure 21:
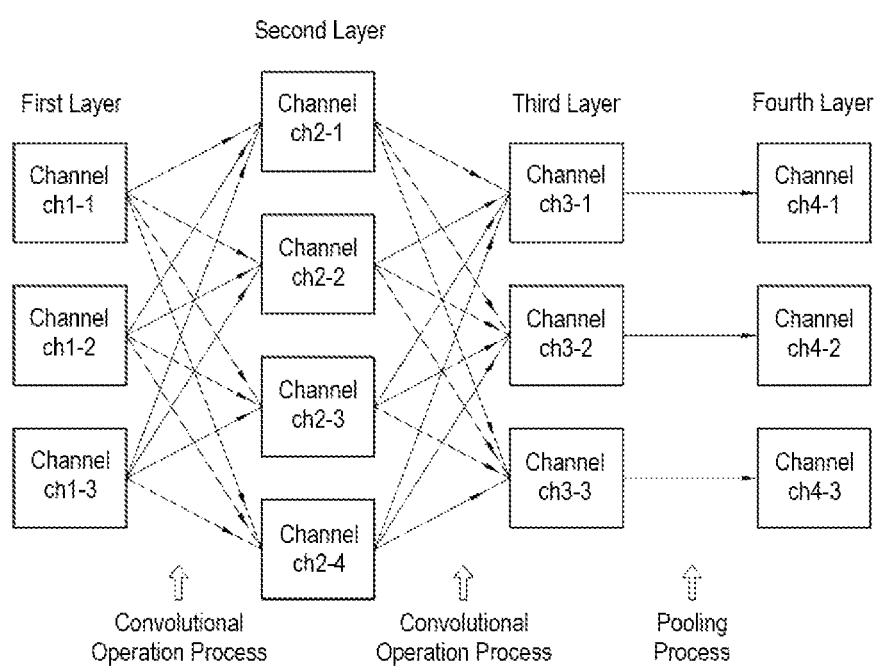
FIG. 21 is a descriptive drawing showing an example of connected layers of a convolutional neural network.
Figure 22:
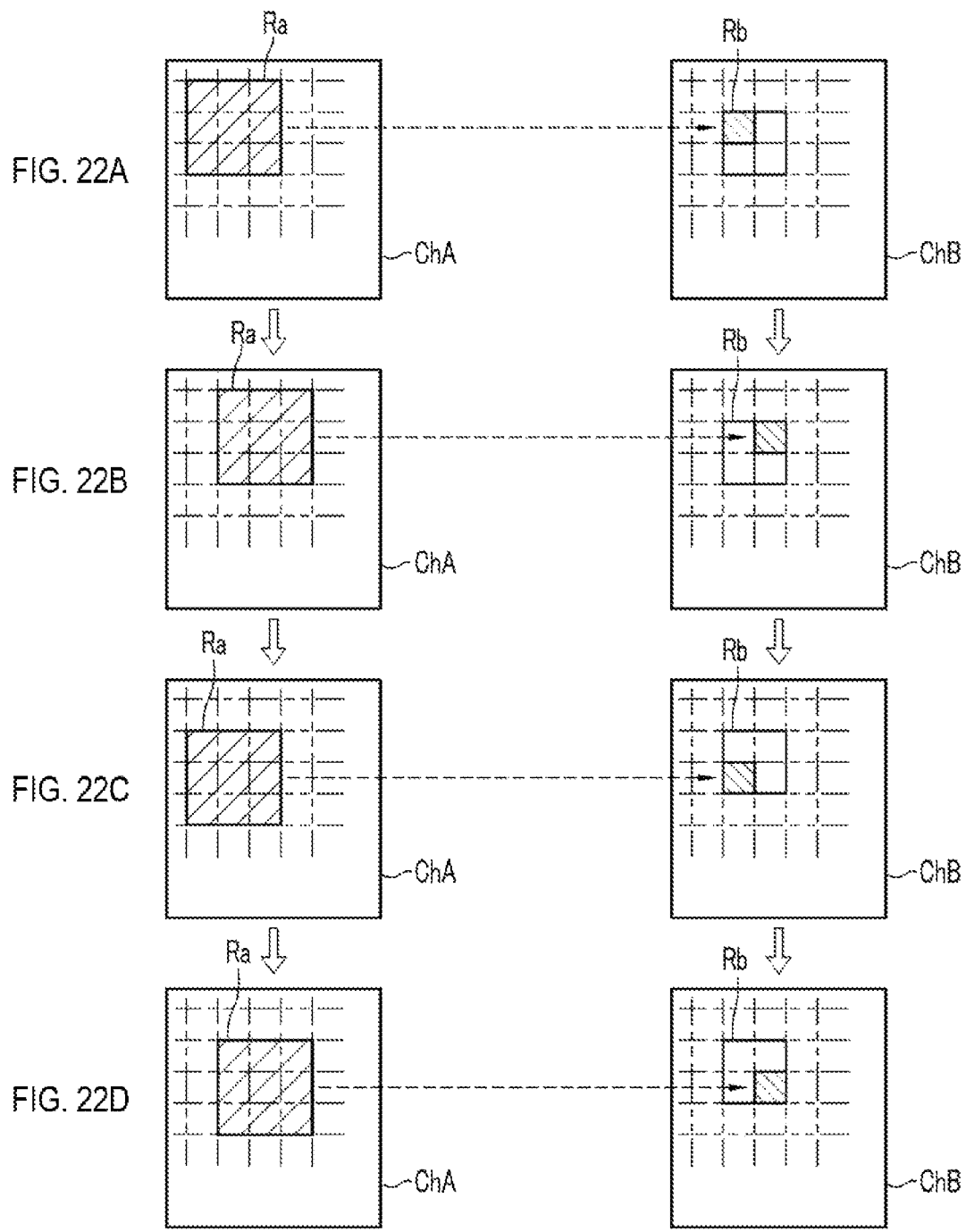
FIGS. 22A to 22D are descriptive drawings showing the relationship between movement of a position in a convolution region and a pooling region.

In the convolutional neural network shown as an example in FIG. 21, first to fourth layers are connected. The first layer has three channels ch1-1 to ch1-3, the second layer has four channels ch2-1 to ch2-4, the third layer has three channels ch3-1 to ch3-3, and the fourth layer has three channels ch4-1 to ch4-3.

Among the first to fourth layers, for example, the first layer and the second layer are subject to the convolution operation process, and as a result of the convolution operation process, the channels ch2-1 to ch2-4 of the second layer are generated from the channels ch1-1 to ch1-3 of the first layer, and the channels ch3-1 to ch3-3 of the third layer are generated from the channels ch2-1 to ch2-4 of the second layer. The third layer is subject to the pooling process, and as a result of the pooling process, the channels ch4-1 to ch4-3 of the fourth layer are generated from the channels ch3-1 to ch3-3 of the third layer.

The number of layers, the convolution operation process, and the layers subject thereto may be selected as desired. In general, the pooling process is repeated after one or more instances of the convolution operation process being performed. Also, layers generated by the pooling process are sometimes then subjected to an additional pooling process. There may be one or more channels in each layer. In the convolution operation process, there are cases when the number of channels increases or decreases in the previous or following layer, but also some cases in which the number of channels does not change. During the pooling process, typically the number of channels remains the same for the previous and following channels.

As described above, in the convolutional neural network, where n is an integer of greater than or equal to 1, an n+1th layer is generated by performing the convolution operation process or the pooling process on the nth layer channel. The generation of a layer is generation of the channels constituting the layer, and the generation of a channel is the calculation of each piece of element data constituting the channel. In the description below, the nth layer is referred to as the previous layer to the n+1th layer, and the n+1th layer is referred to as the following layer to the nth layer. Thus, the convolution operation process and the pooling process performed on the previous layer channels cause the following layer channels to be generated.

The channels are constituted of a plurality of pieces of element data arrayed 2-dimensionally. The array of element data is an arrangement in a data structure, the position of each piece of element data is defined by a plurality of variables (in this description, this refers to two variables including the row and column), and the position information is assigned so as to allow identification of the positional relationship between the pieces of element data. This similarly applies to the weight data to be described later. The size of each channel, or in other words, the number of pieces of element data in the row direction and column direction can be selected as desired, and there is no particular limit thereto.

In this example, 2-dimensional channels are described, but the channels may be 1-dimensional or have three or more dimensions.

In the convolution operation process, convolution operation result data (element data) is calculated by the convolution operation. The convolution operation result data is a value attained by adding the result of applying the convolution filter to each piece of element data in a convolution region for each channel in the previous layer to each convolution region in the same position of each channel. The use of the convolution filter determines the results of a product sum operation on the element data in the convolution region and the weight data of the convolution filter.

The convolution filter has arrayed weight data serving as a weight on the element data. In this example, each convolution filter is constituted of 3×3 (three rows by three columns) weight data arrayed 2-dimensionally. Each piece of weight data of the convolution filter is set to a value based on the object of the convolution filter.

The convolution region defines a range in the channel to which the convolution filter is applied, and has the same array size (in this example, three rows by three columns) as the convolution filter. In the convolution operation, the weight data of the convolution filter is multiplied by the element data of the convolution region at the corresponding positions thereof. In the convolution operation process, the convolution region is moved so as to scan the entirety of the channel while moving the position of the region by a quantity equivalent to one piece of element data at a time, and the convolution operation is performed for every instance the convolution region is moved.

The convolution operation is performed on the channels of the following layer using all channels of the previous layer, and a convolution filter corresponding to the combination of the previous layer channels and the following layer channels is used to perform the convolution operation.

In the example shown in FIG. 21, in generating the channel ch3-1 of the third layer, for example, when applying the convolution filter to the channel ch2-1, the convolution filter corresponding to the combination of the channel ch2-1 and the channel ch3-1 is used, and when applying the convolution filter to the channel ch2-2, the convolution filter corresponding to the combination of the channel ch2-2 and the channel ch3-1 is used. In this manner, when generating the channel ch3-1, four convolution filters corresponding to four combinations of the channel ch3-1 and the channels ch2-1 to ch2-4 are used to perform the convolution operation. Similarly, in generating the channel ch3-2 of the third layer, four convolution filters corresponding to the four combinations of the channel ch3-2 and the channels ch2-1 to ch2-4 are used to perform the convolution operation, and when generating the channel ch3-3, four convolution filters corresponding to the four combinations of the channel ch3-3 and the channels ch2-1 to ch2-4 are used to perform the convolution operation.

In the convolution operation process, a desired number of channels of the previous layer can be used in order to generate one channel of the following layer, and one channel of the previous layer can be used in order to generate one channel of the following layer. Also, in the array, some or all of the plurality of convolution filters used for one layer may have the same weight. Additionally, when the array has the same weight for the convolution filters, one convolution filter in the array with the same weight may be prepared, with the one convolution filter being used to calculate the plurality of channels.

The convolution region Ra in the example shown in FIGS. 22A to 22D is three rows by three columns. In the operation unit 81, in determining the convolution operation result data of a channel ChB of a layer (following layer; the third layer in the example of FIG. 21) subject to the pooling process, a convolution region Ra in the channel ChA of the previous layer is sequentially moved to the position shown in FIG. 22A, the position shown in FIG. 22B shifted by a quantity equivalent to one piece of element data in the row direction from the position of FIG. 22A, the position shown in FIG. 22C shifted by a quantity equivalent to one piece of element data in the column direction from the position of FIG. 22A, and the position shown in FIG. 22D shifted by a quantity equivalent to one piece of element data in the row direction from the position of FIG. 22C. As a result, the convolution operation result data in one pooling region Rb in the channel ChB of the following layer is sequentially calculated. As long as the convolution operation result data in one pooling region Rb is sequentially calculated, then the order in which the convolution operation Ra is moved is not limited to the above order.

The pooling process generates the channels of the following layer in which the size in the row direction and the column direction is shrunk from the channels of the previous layer, for example. In the operation unit 81, a maximum value pooling process of extracting the maximum value from the two-row by two-column pooling regions is performed. As a result, the channels are subdivided among the plurality of pooling regions of two rows by two columns so as not to overlap, and for each of the pooling regions, the element data with the maximum value in the region is outputted as the result of the pooling process. The size of the pooling regions is not limited to two rows by two columns. The pooling regions may be set to p rows by q columns, with either one of p and q being an integer of 1 or greater and the other being an integer of 2 or greater. The pooling regions can be divided such that portions thereof overlap, and in such a case, the pooling process can also be performed so as to generate channels of the following layer with the same size in the row and column directions as the channels of the previous layer.

Figure 23:
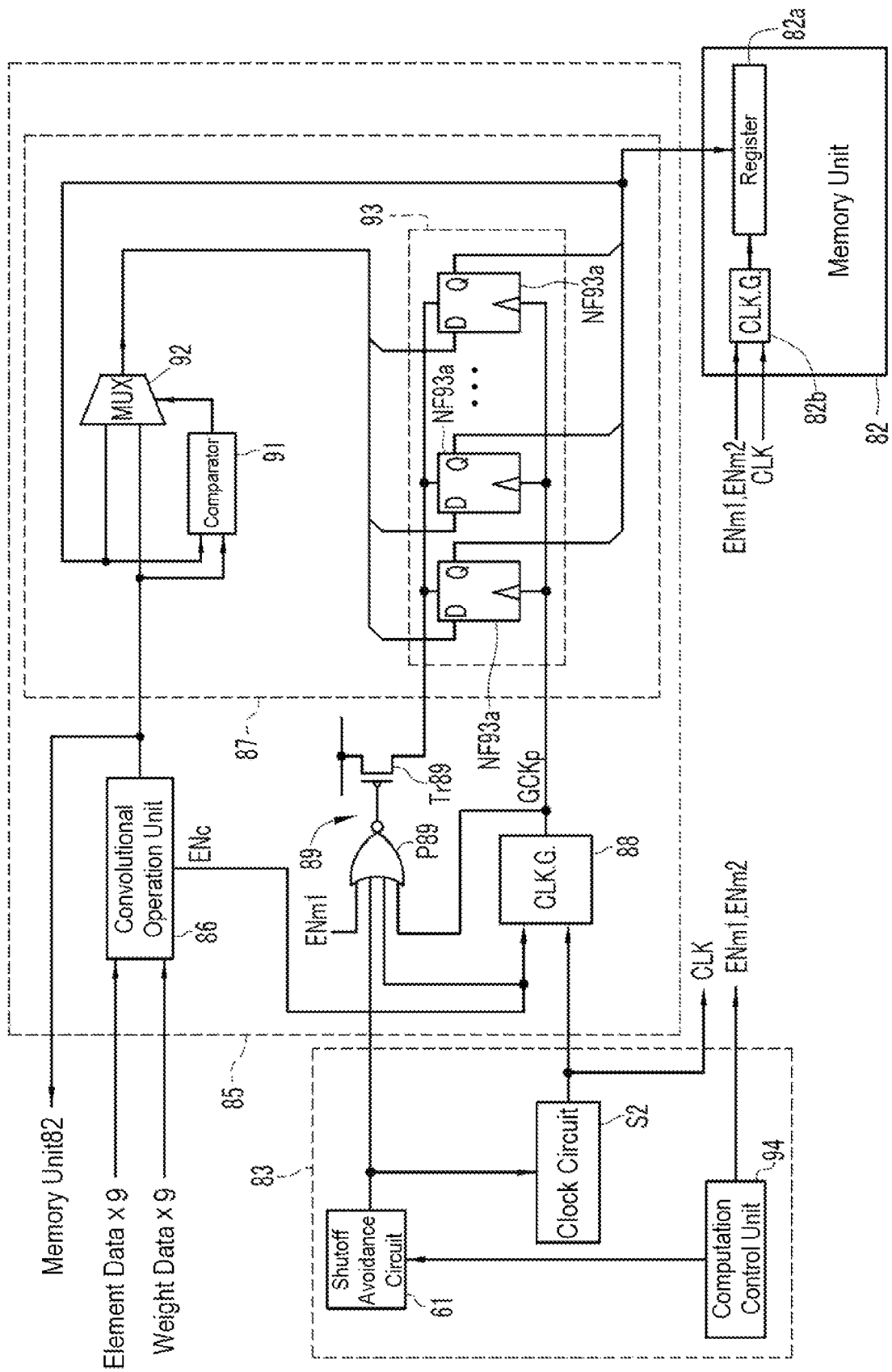
FIG. 23 is a block diagram showing the configuration of an arithmetic unit.

In FIG. 23, the computation unit 85 has a convolution operation unit 86, a pooling processing unit 87, a clock gating circuit 88 as a first clock gating circuit, and a power gating circuit 89. The computation unit 85 is provided with an activation function processing unit that uses an activation function to convert the convolution operation result data outputted from the convolution operation unit 86, a bit count adjustment circuit that converts the data length to a prescribed data length (both not shown), and the like.

The convolution operation unit 86 calculates one piece of convolution operation result data by one instance of the convolution operation. In calculating one piece of convolution operation result data, the convolution operation unit 86 has inputted thereto nine pieces of element data in the convolution region and nine pieces of weight data of the convolution filter for each channel of the previous layer while sequentially switching channels of the previous layer. Thus, the time required for the convolution operation unit 86 to calculate each piece of convolution operation result data changes according to the number of channels of the previous layer. The convolution operation result data calculated in the convolution operation unit 86 is sent to the memory unit 82 and the pooling processing unit 87 as element data of the following layer.

The convolution operation unit 86 is constituted of the same number of multipliers as the number of pieces of weight data of the convolution filter (nine in this example), a selector that selects and outputs multiplication results from each multiplier one at a time, an adder that adds the multiplication results outputted from the selector to data stored in a register, the register that stores the addition results from the adder, and the like. Each multiplier has inputted thereto the element data and the weight data, and outputs the multiplication results from multiplying the foregoing with each other. The element data of each channel of the previous layer and the weight data of the convolution filter are sequentially inputted as described above to the convolution operation unit 86, and finally, the addition results stored in the register are outputted as the convolution operation result data (element data).

The convolution operation unit 86 outputs an enable signal ENc as the first enable signal. The enable signal ENc is inactive (L level) while the convolution operation unit 86 is performing the convolution operation, and is active (H level) when the convolution operation result data is stored in the register and has been outputted. The timing at which the enable signal ENc becomes active in relation to the CLK signal is the same as the enable signal EN11 (see FIG. 1) and the like of Embodiment 1. The enable signal ENc is used in clock gating and power gating.

The pooling processing unit 87 performs the above pooling process, and outputs pooling data (element data) that attains the maximum value within the pooling region. The pooling processing unit 87 has a comparator 91, a multiplexer 92, and a register 93. The comparator 91 has inputted thereto the convolution operation result data from the convolution operation unit 86 and the data (stored data) stored by the register 93. The comparator 91 compares the two pieces of inputted data, and outputs to the multiplexer 92 a selection signal that causes the data with the larger value to be selected. The multiplexer 92 functions as a selector, and selects and outputs one of the two pieces of inputted data on the basis of the selection signal.

The register 93 is a storage register constituted of a plurality of non-volatile flip-flops NF93a, and stores the convolution operation result data outputted from the multiplexer 92. In other words, the non-volatile flip-flops NF93a are provided in correspondence with each bit of the convolution operation result data, and each non-volatile flip-flop NF93a stores one bit corresponding to the convolution operation result data. The non-volatile flip-flops NF93a has a similar configuration to the non-volatile flip-flops of Embodiment 1. Thus, the register 93 is constituted of a non-volatile register that can output data stored when the power source is shut off by storing the convolution operation result data in a non-volatile manner and resuming the supply of power. The register 93 is reset every time output of the maximum value of the pooling regions is complete, and the data is set to an initial value (e.g., the smallest value).

By continuously and sequentially inputting each piece of convolution operation result data of the pooling regions calculated by the convolution operation unit 86 to the pooling processing unit 87, the convolution operation result data taking on the maximum value at the end among the pooling regions is stored in the register 93, and the stored element data is outputted as pooling data for each pooling region.

The register 93 is provided with a clock gating circuit 88 and a power gating circuit 89. The clock gating circuit 88 has inputted thereto the CLK signal and the enable signal ENc. The clock gating circuit 88 has a similar configuration to the clock gating circuit 15 (see FIG. 1) of Embodiment 1, and outputs a gated clock signal GCKp as the first gated clock signal attained by clock gating the CLK signal according to the enable signal ENc. The gated clock signal GCKp is inputted to the CLK terminal of each non-volatile flip-flop NF93a. That is, as a result of the enable signal from the convolution operation unit 86, the clock signal to the register 93 is controlled so as to be active or inactive in synchronization with the output of the convolution operation result data.

The power gating circuit 89 is similar to the power gating circuit 17 of Embodiment 1 (see FIG. 1) and controls the power supply of each non-volatile flip-flop NF93a according to whether the transistor Tr89 is ON or OFF due to the NOR gate P89. The enable signal ENc, the enable signal ENm1 to be described later, the gated clock signal GCKp, and the shutoff avoidance signal are inputted as power source control signals to the NOR gate P89. In this example, the gated clock signal GCKp is an auxiliary signal. The shutoff avoidance signal of the enable signal ENm1 is outputted from the control unit 83.

The memory unit 82 as the acquisition circuit has a register 82a that acquires and temporarily stores the element data to be stored in the memory unit 82, and a clock gating circuit 82b as a second clock gating circuit that performs clock gating on the register 82a. The register 82a is a storage register constituted of a plurality of flip-flops. In this example, each non-volatile flip-flop NF93a of the register 93 is the first flip-flop, and each flip-flop of the register 82a is the second flip-flop.

The clock gating circuit 82b has a similar configuration to the clock gating circuit 15 and has inputted thereto the CLK signal and the enable signals ENm1 and ENm2 for the memory unit 82. The enable signal ENm1 as the second enable signal is an enable signal for the memory unit 82 when storing the pooling data in the memory unit 82, and the enable signal ENm2 is an enable signal for the memory unit 82 when storing the convolution operation result data in the memory unit 82.

The register 82a acquires the convolution operation result data from the convolution operation unit 86 or the pooling data from the register 93 by having inputted thereto the clock pulse of the gated clock signal GCKm generated from the CLK signal and the enable signal ENm1 or ENm2. The convolution operation result data or the pooling data acquired by the register 82a is written to a memory array (not shown) of the memory unit 82.

The control unit 83 has a clock circuit S2, a shutoff avoidance circuit 61, and a computation control unit 94. The shutoff avoidance circuit 61 outputs the shutoff avoidance signal under control of the computation control unit 94 as a mode control unit. When performing the pooling process, the shutoff avoidance mode or the shutoff avoidance mode is selected by control performed by the computation control unit 94 according to the interval (time) that the convolution operation result data determined according to the number of channels in the layer is outputted, and the shutoff avoidance signal is switched between active and inactive. Specifically, if the output interval of the convolution operation result data is greater than or equal to a prescribed threshold time, then the shutoff allowance mode is selected and the shutoff avoidance signal is set to inactive, and when the output interval is shorter than the prescribed threshold time, the shutoff avoidance mode is selected and the shutoff avoidance signal is set to active. When performing the convolution operation process that does not involve the pooling process, the shutoff avoidance signal is set to inactive.

As a result, frequent power source shutoff is not performed in order for the power consumption from the power source shutoff not to increase beyond the decrease in static power consumption in the non-volatile flip-flops NF93a due to the power source shutoff. In this circuit device 80, the convolution operation from parallel processing of the channels is performed, and the interval at which the convolution operation result data is outputted is determined by the layer to be subjected to the pooling process, and thus, it is possible to know the interval in advance.

In the convolution operation by parallel processing of the channels, the greater the number of channels is in the layer to be subjected to the pooling process, the longer the interval at which the convolution operation result data is outputted is. Thus, according to the number of channels in the layer to be subjected to the pooling process, or in other words, if the number of channels is greater than or equal to a prescribed threshold, the shutoff avoidance signal is set to inactive, and if the number of channels is less than the prescribed threshold, the shutoff avoidance signal is set to active.

The clock circuit S2 operates the computation part including the computation units 85 at a high speed by outputting the CLK 0 signal having a relatively high frequency as the CLK signal when the shutoff avoidance signal is active, and outputs the CLK 1 signal with a relatively low frequency as the CLK signal when the shutoff avoidance signal is inactive, thereby enabling power gating of the register 93. As described above, the computation control unit 94 controls the shutoff avoidance circuit 61 and outputs the enable signals ENm1 and ENm2.

An example will be described in which, by the above configuration, the n+1th layer is generated by the convolution operation process due to parallel processing of the channels of the nth layer, and the pooling process is performed on the n+1th layer. As shown in FIGS. 24A, 24B, 25A, and 25B, the nth layer is constituted of channels ChA1, ChA2, etc., and the channels ChB1, ChB2, etc. of the n+1th layer are generated from the nth layer.

Figure 24A:
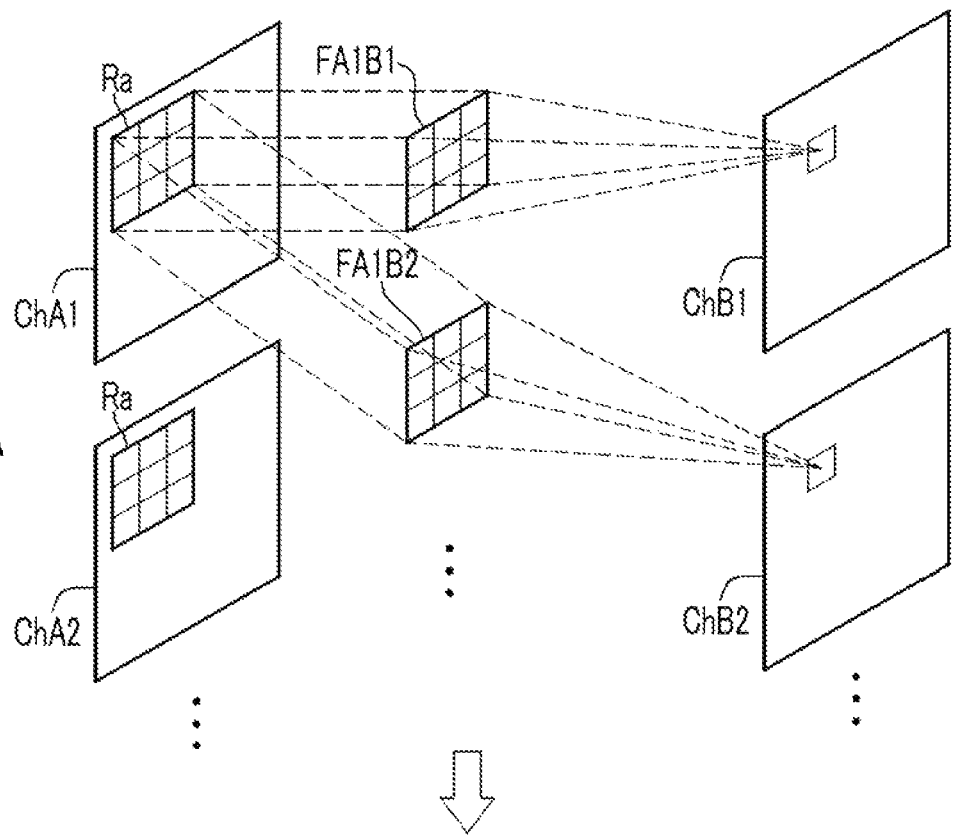
FIGS. 24A and 24B are descriptive drawings showing a state of a convolution operation process performed when performing an operation on the first channel by parallel processing of channels.
Figure 24B:
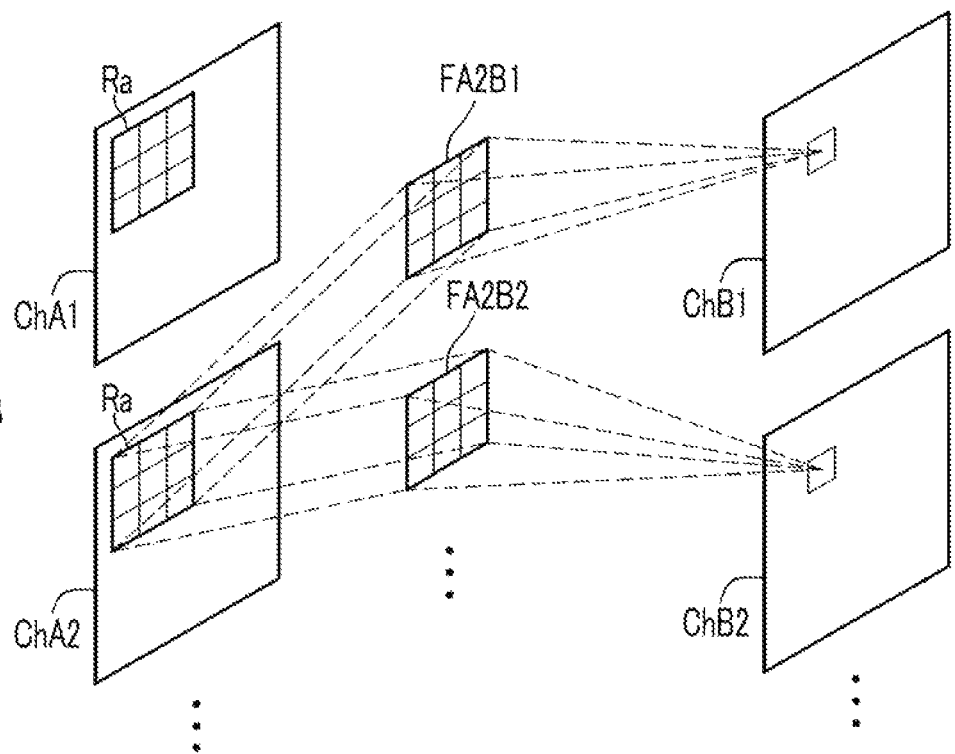

First, each computation unit 85 of the computation part 81 performs computation so as to apply the convolution filter to the convolution region Ra of the first channel ChA1 of the nth layer. The nine pieces of element data of the convolution region Ra of the channel ChA1 are read from the memory unit 82 and inputted to the convolution operation unit 86 of each operation unit 85. Also, a configuration is adopted enabling nine pieces of weight data of each convolution filter to be inputted to the convolution operation unit 86, with the weight data of the convolution filters FA1B1, FA1B2, etc. corresponding to the first channel ChA1 and the first to kth channels ChB1, ChB2, etc. of the following layer being read from the memory unit 82, and respectively inputted to the convolution operation unit 86 of each computation unit 85. As a result, each convolution operation unit 86 multiplies the element data of the convolution region Ra of the inputted channel ChA1 by the weight data of the convolution filter corresponding to each other, and stores each product sum result that is the sum of the multiplication results in the register (FIG. 24A).

Next, each computation unit 85 performs computation so as to apply the convolution filter to the convolution region Ra of the second channel ChA2 of the nth layer in the same position as the first channel ChA1. Nine pieces of element data of each convolution filter Ra in the channel ChA2 are inputted to the convolution operation unit 86 of each computation unit 85, and the weight data of the convolution filters FA2B1, FA2B2, etc. corresponding to the second channel ChA2 and the first to kth channels ChB1, ChB2, etc. of the following layer are respectively inputted to each computation unit 85.

Each of the computation units 85 corresponds to one channel of the following layer until the calculation of all element data of the k channels is complete, for example, and the channel of the corresponding following layer does not change. Thus, in the case of computation performed for the first channel ChA1 of the previous layer, for example, the computation unit 85, to which the weight data of the convolution filter FA1B1 corresponding to the second channel ChB1 is inputted, has inputted thereto the weight data of the convolution filter FA2B2 corresponding to the second channel ChB2 even when performing computation for the second channel ChA2.

As a result of the element data and the weight data being inputted to each computation unit 85, the register of each convolution operation unit 86 has stored therein a value attained by adding the product sum result from applying the convolution filter to the convolution region Ra of the channel ChA1 to the product sum result from applying the convolution filter to the convolution region Ra of the channel ChA2.

Similarly thereafter, the convolution operation unit 86 of each computation unit 85 sequentially performs computation so as to apply the convolution filter to the convolution region Ra of the channels (from the third channel onward) of the nth layer in the same position as the first channel ChA1. When computation by application of the convolution filter to the convolution region Ra of the last channel of the nth layer is complete, the register of each convolution operation unit 86 stores the sum total of the product sum result from applying the convolution filter to the convolution region Ra of each channel in the previous layer, or in other words, the first convolution operation result data for each of the first to kth channels of the following layer. The respective pieces of first convolution operation result data (element data) attained in this manner are outputted to the convolution operation unit 86.

Figure 25A:
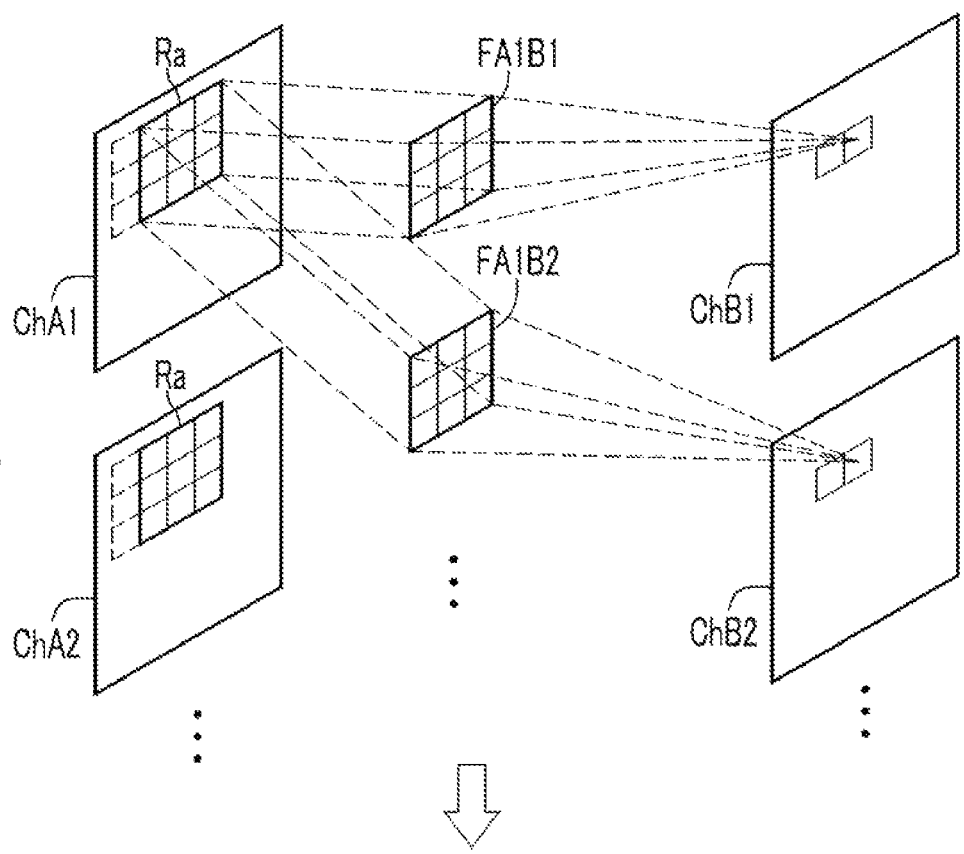
FIGS. 25A and 25B are descriptive drawings showing a state of a convolution operation process performed when performing an operation on the second channel by parallel processing of channels.
Figure 25B:
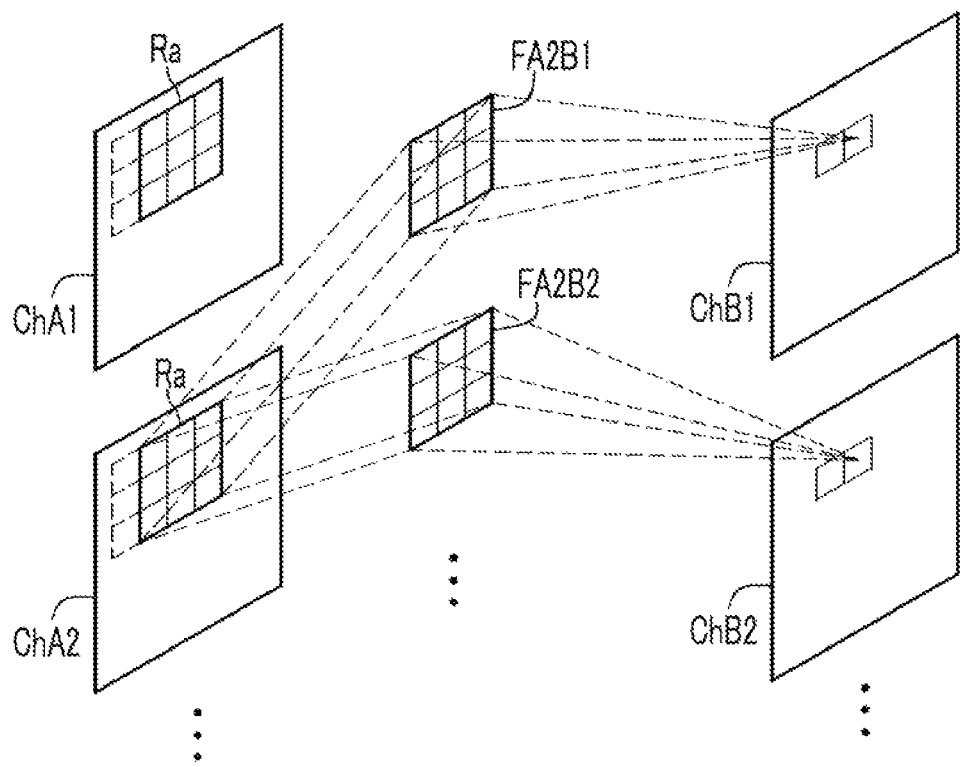

After calculating the first convolution operation result data as described above, the convolution operation unit 86 of each computation unit 85 shifts the convolution region Ra in the row direction by a quantity equivalent to one piece of element data as shown in FIG. 25A, and performs computation of applying the convolution filters FA1B1, FA1B2, etc. to the convolution region Ra of the first channel ChA1 of the previous layer by the same method as described above. Then, as shown in FIG. 25B, the convolution operation unit 86 performs computation so as to apply the convolution filters FA2B1, FA2B2, etc. to the convolution region Ra of the second channel ChA2 of the previous layer by the same method. Similarly thereafter, computation of applying the convolution filters to the convolution region Ra is sequentially performed for each channel (from the third channel onward) of the previous layer, and the second convolution operation result data of each of the first to kth channels is calculated and outputted from the convolution operation unit 86.

After calculating the second convolution operation result data, the convolution region Ra is shifted in the column direction from the initial position by a quantity equivalent to one piece of element data, and the third convolution operation result data is calculated and outputted by the convolution operation unit 86 by the same method as described above. After calculating the third convolution operation result data, the convolution region Ra is shifted in the row direction by a quantity equivalent to one piece of element data, and the fourth convolution operation result data is calculated and outputted by the convolution operation unit 86 by the same method as described above. In this manner, the four pieces of convolution operation result data of the first pooling region to be subjected to the pooling process are consecutively calculated.

In the manner described above, the four pieces of convolution operation result data of the first pooling region are outputted, after which the convolution region Ra is further shifted, and by the same method as described above, the four pieces of convolution operation result data of the second pooling region are sequentially calculated. The convolution operation result data of the third pooling region onward are also calculated in a similar manner.

If performing the convolution operation process by parallel processing of channels as described above, in order for one convolution operation unit 86 to output one piece of convolution operation result data, the convolution operation is sequentially performed for each channel in the nth layer to be subject to the convolution operation process, and the results of the convolution operations are added together. Thus, the number of instances of the convolution operation being performed by the convolution operation unit 86 differs depending on the number of channels in the nth layer, and the interval at which each piece of convolution operation result data is outputted fluctuates, the interval being longer the greater the number of channels is.

If the output interval of the convolution operation result data in the nth layer to be subjected to the convolution operation process is greater than or equal to a prescribed threshold time, for example, the shutoff avoidance signal becomes inactive. As a result of the shutoff avoidance signal being inactive, in the pooling processing unit 87, the enable signal ENm1, the enable signal ENc, and the gated clock signal GCKp are inactive while the convolution operation unit 86 performs the convolution operation, and thus, power supply to each non-volatile flip-flop NF93a of the register 93 is shut off. Also, as a result of the shutoff avoidance signal being inactive, the CLK 1 signal with a relatively low frequency is outputted as the CLK signal from the clock circuit S2.

The enable signal ENc becomes active in response to the first convolution operation result data of the first pooling region being outputted from the convolution operation unit 86. As a result, power is supplied to each of the non-volatile flip-flops NF93 of the register 93. When power supply is started in this manner, in each of the non-volatile flip-flops NF93a, data written to the non-volatile storage circuit is restored and then stored in a basic circuit when the gated clock signal GCKp has reached the L level during the period from when the CLK signal rises next to when the CLK signal reaches the H level. Then, the stored data is outputted from each of the non-volatile flip-flops NF93a. As a result, the data written in a non-volatile manner before the power source was shut off is outputted from the register 93.

As a result, the comparator 91 and the multiplexer 92 have inputted thereto the data from the register 93 and the convolution operation result data from the convolution operation unit 86. The register 93 stores in a non-volatile manner the reset initial value when the convolution operation process starts, the convolution operation result data is selected by the multiplexer 92 on the basis of the comparison results from the comparator 91, and the convolution operation result data is inputted to the register 93. Before the CLK signal rises after the enable signal ENc becomes active, the convolution operation result data selected by the multiplexer 92 is inputted to the register 93.

Then, in synchronization with the clock pulse of the CLK signal, the clock pulse of the gated clock signal GCKp is inputted to each non-volatile flip-flop NF93a of the register 93 from the clock gating circuit 88. The CLK signal is the CLK 1 signal with a relatively low frequency, and the pulse width thereof is the same as the rewrite requirement time. Thus, in each of the non-volatile flip-flops NF93a, data of bits corresponding to the convolution operation result data inputted from the multiplexer 92 is written to the non-volatile storage circuit. At this time, the gated clock signal GCKp is inputted as an auxiliary signal to the NOR gate P89, and thus, even if the enable signal ENc becomes inactive during writing to the non-volatile storage circuit, the writing is completed as normal. After completion of writing in each of the non-volatile flip-flops NF93a, the gated clock signal GCKp as the auxiliary signal becomes inactive (L level).

As described above, when the gated clock signal GCKp becomes inactive, the enable signals ENc and ENm1 and the shutoff avoidance signal become inactive, and thus, power supply to the non-volatile flip-flops NF93a is shut off.

The convolution operation for calculating the second convolution operation result data of the first pooling region is performed by the convolution operation unit 86, and while the pooling processing unit 87 is awaiting input of the second convolution operation result data, the enable signals ENc and ENm1, the gated clock signal GCKp, and the shutoff avoidance signal are maintained at inactive, and thus, the power supply to each of the non-volatile flip-flops NF93a is maintained in a state of being shut off.

The enable signal ENc becomes active in response to the second convolution operation result data being outputted from the convolution operation unit 86, and power supply to the non-volatile flip-flops NF93a of the register 93 is started. As a result of power supply being restored, the data stored prior to the power source shutoff is restored in a manner similar to that described above, and the register 93 outputs the data. Thus, the first convolution operation result data from the register 93 and the second convolution operation result data from the convolution operation unit 86 are inputted to the comparator 91 and the multiplexer 92.

As a result of comparison of the first convolution operation result data and the second convolution operation result data by the comparator 91, the convolution operation result data with the larger value is selected by the multiplexer 92 and the selected convolution operation result data is inputted to the register 93. Similar to the case in which the first convolution operation result data is written, as a result of the clock pulse of the gated clock signal GCKp being inputted to each of the non-volatile flip-flops NF93a thereafter, data of each bit of the convolution operation result data inputted from the multiplexer 92 is written to the non-volatile storage circuit of each of the non-volatile flip-flops NF93a. Then, as a result of the gated clock signal GCKp becoming inactive, power supply to each of the non-volatile flip-flops NF93 of the register 93 is shut off.

Similarly, each time the third and fourth convolution operation result data is outputted, power supply to each of the non-volatile flip-flops NF93a is resumed, and the convolution operation result data outputted from the register 93 and the convolution operation result data outputted from the convolution operation unit 86 are compared. After each bit of the convolution operation result data with the larger value is written to the non-volatile storage circuit of each non-volatile flip-flop NF93a, power supply to the non-volatile flip-flop NF93a is shut off. In this manner, the operation result data with the maximum value in the first pooling region is written in a non-volatile manner to the register 93.

After the power supply is shut off upon the operation result data with the maximum value being written to the register 93, the enable signal ENm1 that activates the register 82a of the memory unit 82 is set to active. By setting the enable signal ENm1 to active, power supply to each non-volatile flip-flop NF93a is started, and the convolution operation result data with the maximum value in the first pooling region is outputted from the register 93. In other words, the pooling data is outputted from the register 93. Then, as a result of input of the clock pulse of the gated clock signal GCKm, the register 82a of the memory unit 82 acquires pooling data from the register 93, and the pooling data is stored in the memory unit 82 as one piece of element data of one channel of the n+2nd layer. Power supply to each of the non-volatile flip-flops NF93a is shut off as a result of the enable signal ENm1 becoming inactive.

Regarding the second pooling region and onward, through a similar method, each non-volatile flip-flop NF93a of the register 93 is subjected to power gating while determining the pooling data, and all element data of the first to kth channels of the n+2nd layer is determined and written to the memory unit 82.

If there is a k+1th channel or subsequent channels in the n+2nd layer, all element data for all of the channels is calculated by repeating the same method as described above.

If only the convolution operation process is performed, and if the output interval of the convolution operation result data is shorter than a prescribed threshold time in a case where the pooling process is involved in the convolution operation process as described above, then the shutoff avoidance signal is set to active by the computation control unit 94. In this case, during the period in which the convolution operation process and the pooling process are performed, the transistor Tr89 is always ON, and a state where power is supplied to each of the non-volatile flip-flops NF93a of the register 93 continues. Also, as a result of the shutoff avoidance signal being active, the CLK 0 signal with a relatively high frequency is outputted as the CLK signal from the clock circuit S2.

Thus, in the pooling processing unit 87, a similar operation is performed to when the shutoff avoidance signal is inactive, except that non-volatile writing and restoring of each of the non-volatile flip-flops NF93a in the register 93 is not performed. In other words, every time the clock pulse of the gated clock signal GCKp is inputted, the convolution operation result data of the convolution operation unit 86 is compared to the data stored in the register 93, and the largest value convolution operation result data among the compared data is stored in the register 93 and outputted. The operation result data with the largest value for the one pooling region is stored in the register 93, and when the stored operation result data is outputted, the pooling data outputted from the register 93 is acquired by and stored in the memory unit 82 as one piece of element data of one channel of the n+2nd layer. At this time each component of the computation unit 85 operates at high speed with the CLK 0 signal with a high frequency being used as the CLK signal.

Whether or not to shut off the power source to the pooling processing unit 87 is controlled on the basis of the interval at which the convolution operation result data is outputted as described above, and thus, the power consumption in the non-volatile flip-flops NF93a of the register 93 decreases.

Embodiment 3

Embodiment 3 is an example of a logic circuit design support device that supports the design of a semiconductor circuit device including non-volatile flip-flops. Members, circuits, and the like that are substantially the same as those Embodiment 1 are assigned the same reference characters and detailed descriptions thereof are omitted.

Figure 26:
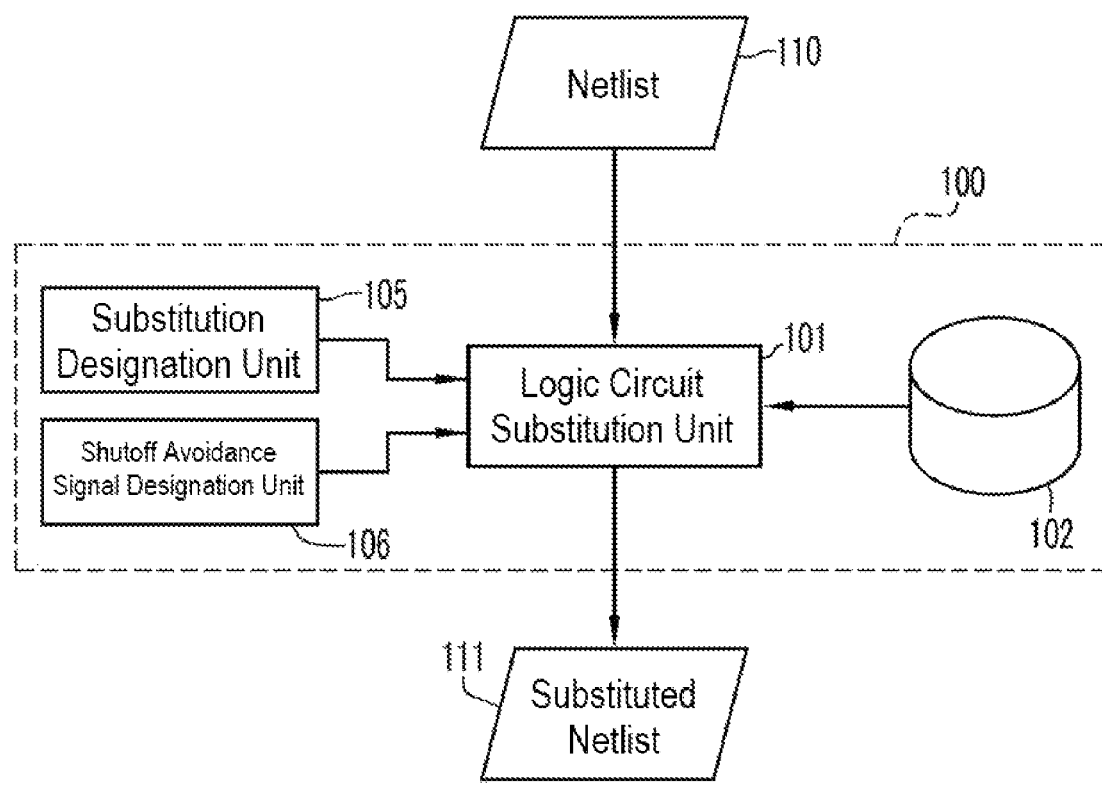
FIG. 26 is a block diagram showing a configuration of a logic circuit design support device according to Embodiment 3.

As shown in FIG. 26, the logic circuit design support device 100 designates a flip-flop that is not non-volatile, thereby substituting the designated flip-flop with a non-volatile flip-flop, including a power gating circuit. The logic circuit design support device 100 has a logic circuit substitution unit 101, a library 102, a substitution designation unit 105, and a shutoff avoidance signal designation unit 106. The logic circuit design support device 100 is configured such that a computer functions as each component by installing a logic circuit design support program in the computer, for example. The logic circuit design support device 100 can function as a portion of a logic synthesis device.

The logic circuit substitution unit 101 has inputted thereto a netlist 110 generated by logic synthesis. The netlist 110 is code written into hardware by connecting various logic gates, flip-flops, and the like, or in other words, is code written into hardware at the gate level. The netlist 110 is generated by performing logic synthesis of an HDL (hardware description language) source in which circuit operations abstracted to the register transfer level are written in the HDL.

The flip-flops coded in the netlist 110 do not include non-volatile flip-flops. The logic circuit substitution unit 101 edits the netlist 110, substitutes the flip-flops designated by the substitution designation unit 105 with the non-volatile flip-flops together with the power gating circuit, and outputs a substitution netlist 111 (hereinafter referred to as the substituted netlist) where the connections are changed to perform power gating as described in Embodiment 1. If the shutoff avoidance signal is designated by the shutoff avoidance signal designation unit 106, the logic circuit substitution unit 101 connects the signals (signal lines and circuit outputs) in the substituted netlist 111 to the power gating circuit as a shutoff avoidance signal.

The library 102 has recorded therein cells and the like such as non-volatile flip-flops to which the power gating circuits are added, and as will be described later, is referred to when the logic circuit substitution unit 101 performs substitution.

The substitution designation unit 105 designates a flip-flop to be substituted that is coded in the netlist 110 as a flip-flop that is not non-volatile to be replaced with a non-volatile flip-flop. Also, the shutoff avoidance signal designation unit 106 designates a signal to be the shutoff avoidance signal. There is no limitation to the designation methods by the substitution designation unit 105 and the shutoff avoidance signal designation unit 106. The logic circuit design support device 100 has a circuit display function of displaying a circuit diagram indicated in the netlist 110, and the flip-flops and signal lines in the displayed circuit diagram may be designated by an operation member such as a mouse or keyboard.

In editing the netlist 110 and generating the substituted netlist 111, the logic circuit substitution unit 101 substitutes the flip-flop to be substituted with the non-volatile flip-flop to which the power gating circuit constituted of a NOR gate and a transistor is added. Also, the logic circuit substitution unit 101 performs editing to add connections such that the enable signal inputted to the clock gating circuit of the flip-flop to be substituted, the gated clock signal outputted from the clock gating circuit, and the enable signal to the following stage flip-flop to the flip-flop to be substituted are inputted to the NOR gate as power source control signals. If signals are designated by the shutoff avoidance signal designation unit 106, editing is performed to add connections such that the designated signal is inputted to the NOR gate as the shutoff avoidance signal. In this manner, the logic circuit substitution unit 101 edits the netlist 110 in a systematic manner to generate the substituted netlist 111.

FIG. 27 schematically shows an example of substitution performed by the logic circuit substitution unit 101 from the netlist 110 to the substituted netlist 111. In the netlist 110 of this example, a combinational circuit 114 is connected to the input side of a flip-flop FF113 and a combinational circuit 115 is connected to the output side, and a flip-flop FF116 is connected to the flip-flop FF113 via the combinational circuit 115. Also, the flip-flops FF113 and FF116 are connected to the clock gating circuits 117 and 118. The enable signal EN113 corresponding to the flip-flop FF113 and the CLK signal are inputted to the clock gating circuit 117, and the enable signal EN116 corresponding to the flip-flop FF116 and the CLK signal are inputted to the clock gating circuit 118. Additionally, a circuit 119 that switches the output signal between active and inactive is provided.

If designating the flip-flop FF113 to be substituted, the logic circuit substitution unit 101 substitutes the designated flip-flop FF113 with a circuit cell 125 constituted of a non-volatile flip-flop NF121 and a power gating circuit 122 including a NOR gate P122 and a transistor Tr122. At this time, editing is performed to add connections such that the enable signal EN113 as the enable signal of the non-volatile flip-flop NF121, the enable signal EN116 of the flip-flop FF116 at the stage following the non-volatile flip-flop NF121, and the gated clock signal GCK113 outputted from the clock gating circuit 117 are inputted to the NOR gate P122 as power source control signals. Also, if output signals of the circuit 119 are designated by the shutoff avoidance signal designation unit 106, editing is performed to add connections such that the output signal is inputted to the NOR gate P122 as the shutoff avoidance signal.

Figure 28:
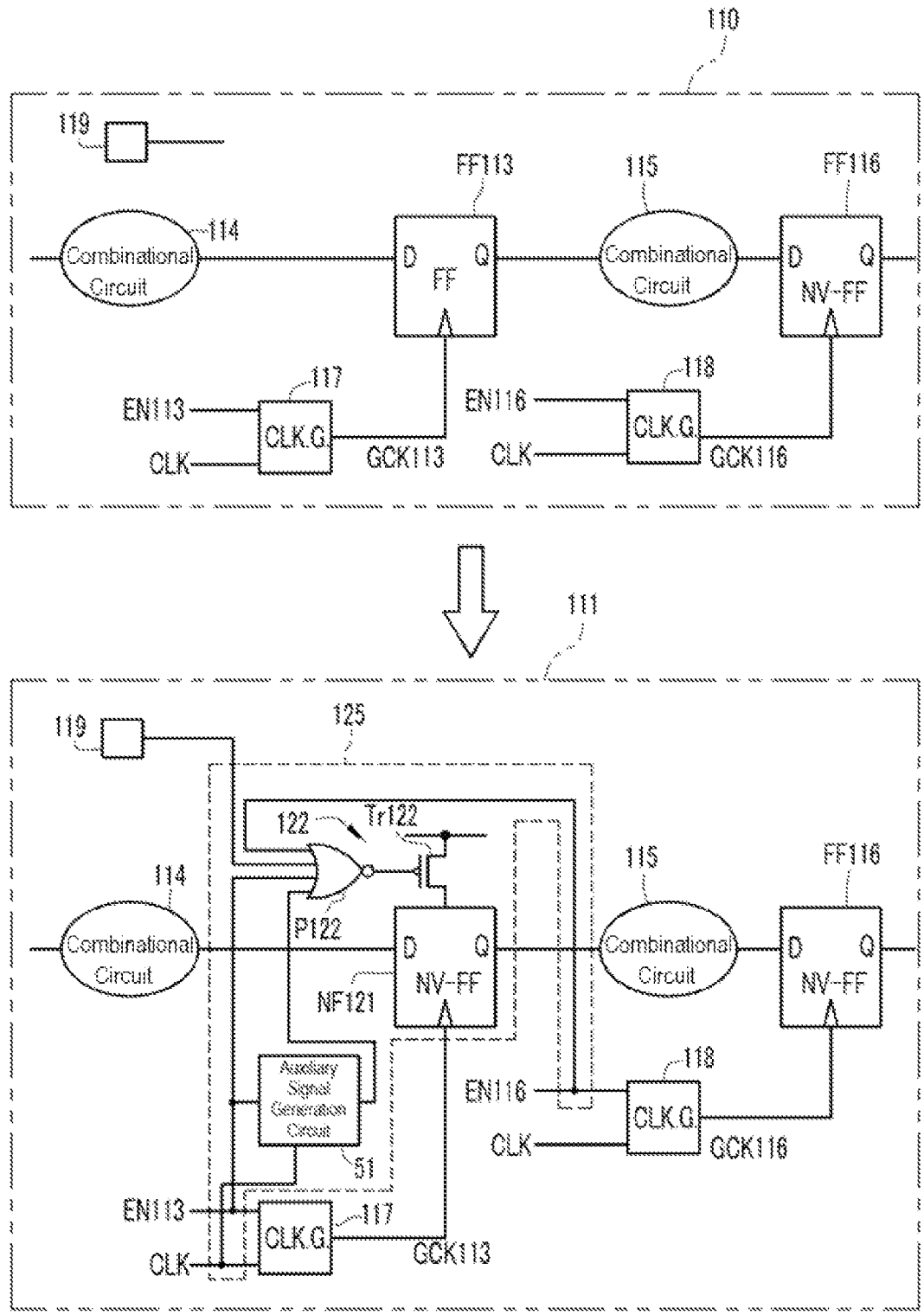
FIG. 28 is a descriptive drawing showing another example of substitution performed by the logic circuit design support device.

As shown in FIG. 28, in substituting the flip-flop FF113 to be substituted with the non-volatile flip-flop NF121 to which the power gating circuit 122 is added, an auxiliary signal generation circuit 51 may also be added. In this case, the connection is edited such that the auxiliary signal of the auxiliary signal generation circuit 51 is inputted to the NOR gate P122 instead of the gated clock signal GCK113. Also, the logic circuit substitution unit 101 performs editing for adding connections such that the enable signal EN113 inputted to the clock gating circuit 117 is inputted to the NOR gate P122 and the auxiliary signal generation circuit 51, the enable signal EN116 to the following stage flip-flop FF116 is inputted to the NOR gate P122, and the CLK signal is inputted to the auxiliary signal generation circuit 51.

As described above, substitution of the flip-flop FF113 with the non-volatile flip-flop NF121 including the power gating circuit 122 is performed in a systematic manner, including the editing of the connection of the enable signal EN116 of the next stage flip-flop FF116, and thus, the substitution can be performed with ease.

What is claimed is:

1. A semiconductor circuit device, comprising:
   a first clock gating circuit configured to output a first gated clock signal generated from a clock signal, in response to a first enable signal that enables or disables the clock signal;
   a non-volatile first flip-flop configured to operate in response to a clock pulse of the first gated clock signal;
   an acquisition circuit, configured to acquire data inputted from the first flip-flop, directly or via a combinational circuit, according to a second enable signal that enables or disables the acquisition of the data from the first flip-flop; and a power gating circuit including a power switch that is provided on a power source line through which electric power is supplied to the first flip-flop, the power gating circuit receiving the first enable signal and the second enable signal as power source control signals, and supplying the electric power to the first flip-flop by turning ON the power switch when the first enable signal has a logical value that enables the clock signal or when the second enable signal has a logical value that enables the acquisition of the data in the acquisition circuit.

2. The semiconductor circuit device according to claim 1, further comprising:

an auxiliary signal generation circuit configured to output an auxiliary signal that maintains a logical value that turns ON the power switch while the clock pulse of the first gated clock signal is outputted, wherein the power gating circuit further receives the auxiliary signal as the power source control signal, and further supplies the electric power to the first flip-flop by turning ON the power switch when the auxiliary signal has the logical value that turns ON the power switch.

3. The semiconductor circuit device according to claim 1, wherein the first clock gating circuit inputs the first gated clock signal to the power gating circuit as an auxiliary signal that maintains a logical value that turns ON the power switch while the clock pulse of the first gated clock signal is outputted, and the power gating circuit further receives the auxiliary signal as the power source control signal, and further supplies the electric power to the first flip-flop by turning ON the power switch when the auxiliary signal has the logical value that turns ON the power switch.

4. The semiconductor circuit device according to claim 1, further comprising:

a shutoff avoidance circuit having a shutoff avoidance mode for not shutting off electric power supply to the first flip-flop from the power source line, and a shutoff allowance mode for shutting off the electric power supply to the first flip-flop, the shutoff avoidance circuit being configured to output a shutoff avoidance signal having a logical value corresponding to one of the shutoff avoidance mode or the shutoff allowance mode, wherein the power gating circuit receives the shutoff avoidance signal as one of the power source control signals, and maintains the power switch to be ON while the shutoff avoidance signal has the logical value corresponding to the shutoff avoidance mode, and turns the power switch ON or OFF according to the other one of the power source control signals when the shutoff avoidance signal has the logical value corresponding to the shutoff allowance mode.

5. The semiconductor circuit device according to claim 1, wherein the first flip-flop stores the data in a non-volatile manner in response to inputting the first gated clock signal that has the clock pulse of a prescribed pulse width or greater while the electric power to the first flip-flop is supplied, and outputs the stored data when electric power supply to the first flip-flop is resumed after the electric power supply is stopped.

6. The semiconductor circuit device according to claim 1, further comprising:

a shutoff avoidance circuit having a shutoff avoidance mode for not shutting off electric power supply to the first flip-flop from the power line, and a shutoff allowance mode for shutting-off of the electric power supply to the first flip-flop, the shutoff avoidance circuit being configured to output a shutoff avoidance signal having a logical value corresponding to one of the shutoff avoidance mode or the shutoff allowance mode; and a clock circuit including a clock signal generator configured to generate a first clock signal having a clock pulse of a prescribed pulse width or greater, and a second clock signal having a clock pulse of a pulse width less than the prescribed pulse width and having a frequency higher than a frequency of the first clock signal, and a selector configured to receive the first clock signal and the second clock signal, select the first clock signal when the shutoff avoidance signal has the logical value corresponding to the shutoff allowance mode and the second clock signal when the shutoff avoidance signal has the logical value corresponding to the shutoff avoidance mode, and output a selected one as the clock signal, wherein the first flip-flop stores the data in a non-volatile manner in response to inputting the first gated clock signal that has the clock pulse of the prescribed pulse width or greater while the electric power is supplied, and outputs the stored data when the electric power supply to the first flip-flop is resumed after the electric power supply to the first flip-flop is stopped, and the power gating circuit further receives the shutoff avoidance signal as one of the power source control signals, and maintains the power switch to be ON while the shutoff avoidance signal has the logical value corresponding to the shutoff avoidance mode, and turns the power switch ON or OFF according to the rest of the power source control signals when the shutoff avoidance signal has the logical value corresponding to the shutoff allowance mode.

7. The semiconductor circuit device according to claim 1, further comprising:

a second clock gating circuit configured to output a second gated clock signal generated from the clock signal, in response to the second enable signal, wherein the acquisition circuit is a second flip-flop configured to operate in response to a clock pulse of the second gated clock signal.

8. The semiconductor circuit device according to claim 1, further comprising:

an enable signal generation circuit provided in correspondence with the first flip-flop, and including a first generation circuit constituted of a circuit that is not subjected to power gating, and being configured to generate a first sub-enable signal and output the first sub-enable signal as the first enable signal, and a second generation circuit constituted of a circuit including a control-side non-volatile flip-flop and being configured to generate a second sub-enable signal, the electric power supply to the second generation circuit being controlled by an enable signal power source control signal including the first sub-enable signal, the electric power being supplied to the second generation circuit when at least the first sub-enable signal is enabled; and a selector configured to receive new data and an output from the first flip-flop, and the second sub-enable signal as a selection control signal, select and output the new data when the second sub-enable signal is enabled, and select and output the output from the first flip-flop when the second sub-enable signal is disabled.

9. The semiconductor circuit device according to claim 1, further comprising:
a combinational circuit connected to an input side or an output side of the first flip-flop; and
a combinational circuit power switch provided on the power source line through which the electric power is supplied to the combinational circuit, the combinational circuit power switch being controlled to be turned ON or OFF by a switching signal for the combinational circuit power switch.

10. A semiconductor circuit device, comprising:
a first clock gating circuit configured to output a first gated clock signal generated from a clock signal, in response to a first enable signal that enables or disables the clock signal;
a convolution operation unit configured to, for each instance of calculating convolution operation result data that is element data of a following layer channel attained by performing a convolution operation on each convolution region of a plurality of channels of a previous layer, output the convolution operation result data such that the element data in a pooling region of the following layer channel is continuously and sequentially outputted;
a pooling processing unit including
a register including a plurality of non-volatile first flip-flops, the register being configured to operate in response to a clock pulse of the first gated clock signal while electric power to the register is being supplied, store data in a non-volatile manner when the clock pulse has a prescribed pulse width or greater and output the data stored in a non-volatile manner when the electric power to the register is resumed after the electric power to the register is stopped,
a comparator configured to compare the convolutional operation result data from the convolutional operation unit with the stored data in the register, and
a pooling selector configured to receive the convolutional operation result data from the convolutional operation unit and the stored data, select one of data with a greater value among the inputted data on the basis of a comparison result of the comparator, and store selected data as new stored data in the register, wherein the pooling processing unit is configured to output to an acquisition circuit the stored data in the register as pooling data after input of each piece of the convolutional operation result data of the pooling region for each of the pooling regions, the acquisition circuit acquiring data according to a second enable signal that enables or disables the acquisition of the data in the acquisition circuit;
a shutoff avoidance circuit having a shutoff avoidance mode for not shutting off electric power supply to the register, and a shutoff allowance mode for shutting off the electric power supply to the register, the shutoff avoidance circuit being configured to output a shutoff avoidance signal having a logical value corresponding to one of the shutoff avoidance mode or the shutoff allowance mode;
a clock circuit including
a clock signal generator configured to generate a first clock signal having a clock pulse with a prescribed pulse width or greater, and a second clock signal having a clock pulse with a pulse width less than the prescribed pulse width and having a frequency higher than a frequency of the first clock signal, and
a selector configured to receive the first clock signal and the second clock signal, select the first clock signal when the shutoff avoidance signal has the logical value corresponding to the shutoff allowance mode and the second clock signal when the shutoff avoidance signal has the logical value corresponding to the shutoff avoidance mode, and output a selected one as the clock signal;
a mode control unit that causes the shutoff avoidance circuit to select the shutoff allowance mode when an output interval of the convolution operation result data from the convolution operation unit is greater than or equal to a prescribed threshold, and causes the shutoff avoidance circuit to select the shutoff avoidance mode when the output interval is shorter than the prescribed threshold; and
a power gating circuit including a power switch provided on a power source line through which the electric power is supplied to the register, the power gating circuit being configured to
receive the first enable signal, the second enable signal, and the shutoff avoidance signal as power source control signals,
maintain the power switch to be ON while the shutoff avoidance signal has the logical value corresponding to the shutoff avoidance mode and turn ON or OFF the power switch according to another one of the power source control signals when the shutoff avoidance signal has the logical value corresponding to the shutoff allowance mode, and
turn ON the power switch to supply the electric power to the register when the first enable signal has a logical value that enables the clock signal or the second enable signal has a logical value that enables the acquisition of the data in the acquisition circuit.

11. The semiconductor circuit device according to claim 10, further comprising:
an auxiliary signal generation circuit configured to output an auxiliary signal that maintains a logical value that turns ON the power switch while the clock pulse of the first gated clock signal is outputted, wherein
the power gating circuit further receives the auxiliary signal as the power source control signal, and when the auxiliary signal has the logical value for turning ON the power switch, supplies the electric power to the register by turning ON the power switch regardless of the logical values of the rest of the power source control signals.

* * * * *